United States Patent
Rogers et al.

(10) Patent No.: US 12,281,953 B2
(45) Date of Patent: Apr. 22, 2025

(54) SYSTEMS AND METHODS FOR SENSING IMPACTS APPLIED TO AN ARTICLE DURING PRODUCTION

(71) Applicant: Smart Skin Technologies Inc., Fredericton (CA)

(72) Inventors: Daniel Rogers, McLeod Hill (CA); Jonathan Halse, Saint Andrews (CA); Kumaran Thillainadarajah, Fredericton (CA); Adam Joseph MacDonald, Hanwell (CA); Jordan Ritchie, Island View (CA)

(73) Assignee: Smart Skin Technologies Inc., Fredericton (CA)

( * ) Notice: Subject to any disclaimer, the term of this patent is extended or adjusted under 35 U.S.C. 154(b) by 0 days.

(21) Appl. No.: 16/804,190

(22) Filed: Feb. 28, 2020

(65) Prior Publication Data

US 2021/0270686 A1 Sep. 2, 2021

(51) Int. Cl.
*G01L 5/00* (2006.01)
*G01H 1/00* (2006.01)

(52) U.S. Cl.
CPC ............ *G01L 5/0052* (2013.01); *G01H 1/00* (2013.01)

(58) Field of Classification Search
None
See application file for complete search history.

(56) References Cited

U.S. PATENT DOCUMENTS

| | | | |
|---|---|---|---|
| 4,745,564 A | 5/1988 | Tennes et al. | |
| 4,989,462 A | 2/1991 | Davis et al. | |
| 10,082,519 B2 | 9/2018 | Xu et al. | |
| 2004/0226392 A1 | 11/2004 | McNally | |
| 2005/0177929 A1 | 8/2005 | Greenwald et al. | |

(Continued)

FOREIGN PATENT DOCUMENTS

| | | |
|---|---|---|
| CA | 2820641 A1 | 5/2012 |
| WO | 2016146759 A1 | 9/2016 |

OTHER PUBLICATIONS

Espacenet machine translation, Koga Yujiro et al., "Package Impact Detecting Apparatus, Package Impact Detecting Method, and Package Impact Detecting Program" Dec. 19, 2018 (Year: 2018).*

(Continued)

*Primary Examiner* — Michael J Dalbo
*Assistant Examiner* — Denise R Karavias

(57) ABSTRACT

Systems and methods are provided for sensing impacts applied to an article during a production and transportation process. The systems and methods can include a plurality of impact sensors fixed to the article and a processor coupled to the plurality of impact sensors. Each impact sensor can be fixed to the article at a corresponding sensor location and the plurality of impact sensors can be configured to generate a plurality of impact measurements in response to an impact applied to the article. The processor can be configured to: receive the plurality of impact measurements from the plurality of impact sensors; determine, from the plurality of impact measurements, that an impact condition is satisfied; determine an impact location based on the plurality of impact measurements and the corresponding sensor locations; and determine an overall impact magnitude based on the impact location and the plurality of impact measurements.

27 Claims, 13 Drawing Sheets

(56) References Cited

U.S. PATENT DOCUMENTS

| | | | | |
|---|---|---|---|---|
| 2008/0092662 | A1* | 4/2008 | Mizuguchi | G01M 7/04 73/666 |
| 2012/0124720 | A1* | 5/2012 | Evans | A42B 3/046 2/424 |
| 2013/0265153 | A1* | 10/2013 | Taylor | G08B 21/182 340/665 |
| 2014/0102217 | A1* | 4/2014 | Inaba | G01P 15/097 73/862.59 |
| 2014/0366650 | A1* | 12/2014 | Thillainadarajah | G01L 1/26 73/862.625 |
| 2015/0226618 | A1* | 8/2015 | Shih | G01L 1/16 310/329 |
| 2015/0301521 | A1* | 10/2015 | Byron | G01P 15/18 700/108 |
| 2015/0321094 | A1* | 11/2015 | Wei | A63F 13/21 463/31 |
| 2016/0054354 | A1* | 2/2016 | Keal | G01P 15/16 702/141 |
| 2017/0372585 | A1 | 12/2017 | Evangelista, IV et al. | |
| 2019/0011476 | A1* | 1/2019 | Zimmermann | G01P 15/038 |
| 2019/0028215 | A1* | 1/2019 | Kitsunezuka | H04B 7/0634 |
| 2019/0383696 | A1* | 12/2019 | Shiotani | G01M 5/0066 |
| 2022/0128728 | A1* | 4/2022 | Golwala | G01H 1/00 |

OTHER PUBLICATIONS

Science Direct, Inertial Sensor—an overview | ScienceDirect Topics, downloaded from https://www.sciencedirect.com/topics/engineering/inertial-sensor#:~:text=An%20inertial%20sensor%20measures%20the,by%20indirectly%20measuring%20specific%20forces), downloaded Aug. 23, 2021 (Year: 2019).*

R.C. Hibbler, Engineering Mechanics Statics, Twelfth Edition, 2010, Chapter 2 (Year: 2010).*

Hirotsugu Inoue et al., "Review of inverse analysis for indirect measurement of impact force," Applied Mechanics Reviews, vol. 54 Issue 6, downloaded from https://asmedigitalcollection.asme.org/appliedmechanicsreviews/article/54/6/503/458218/Review-of-inverse-analysis-for-indirect on Aug. 10, 2022 (Year: 2001).*

International Search Report and Written Opinion mailed Mar. 22, 2021 in related International Patent Application No. PCT/CA2021/050021 (8 pages).

Extended European Search Report issued Feb. 6, 2024 in related EP Patent Application No. 21760186.3 (10 pages).

* cited by examiner

SYSTEMS AND METHODS FOR SENSING IMPACTS APPLIED TO AN ARTICLE DURING PRODUCTION

FIELD

The embodiments described herein generally relate to sensing impacts, and in particular to sensing impacts during a production process.

BACKGROUND

The following is not an admission that anything discussed below is part of the prior art or part of the common general knowledge of a person skilled in the art.

Various types of packaging or packages can be used to enclose or protect a product for distribution, storage, sale, and/or use. A package can provide physical protection for the product stored therein. For example, the package may protect the product from damage that may be caused by mechanical shock, compression, vibration or other forms of energy transfer. The package may also act as a barrier to heat, oxygen, humidity, dust, bacteria, and/or other undesirables. The package can reduce the risk of degradation or contamination and enhance the shelf life and safety of the product.

At various stages of production, transportation and distribution, a product may be subject to potentially damaging forces. For example, a production line may include equipment or machinery for filling, sealing, labeling, and/or transporting the product. Each stage in the production line may involve some (direct or indirect) physical contact between the equipment and the product that could potentially result in damage. Similarly, during shipping, the product may experience various physical forces, as the product is physically transported to a destination.

Modern production and transportation processes may be highly optimized to reduce the risk of damage to a product to low levels. However, when damage is detected, it can be difficult to identify the source of the damage along the production and transportation process. Continuing to produce damaged products can be costly, as the damaged products may be able difficult or impossible to sell. In some cases, damaged products may also pose a danger to other products or to people or animals, for instance if the product contents are potentially hazardous.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

The various embodiments described herein generally relate to systems and methods for sensing impacts applied to an article. The impacts may be sensed while the article is undergoing a production, distribution and/or transportation process.

In accordance with an aspect of this disclosure, there is provided an impact sensing system for sensing impacts applied to an article. The impact sensing system can include a plurality of impact sensors fixed to the article and a processor coupled to the plurality of impact sensors. Each impact sensor can be fixed to the article at a corresponding sensor location and the plurality of impact sensors can be configured to generate a plurality of impact measurements in response to an impact applied to the article. The processor can be configured to: receive the plurality of impact measurements from the plurality of impact sensors; determine, from the plurality of impact measurements, that an impact condition is satisfied; determine an impact location based on the plurality of impact measurements and the corresponding sensor locations; and determine an overall impact magnitude based on the impact location and the plurality of impact measurements.

In any embodiment, the plurality of impact measurements can include a set of impact measurements from each impact sensor. The processor can be further configured to: determine a plurality of local impact magnitudes, each local impact magnitude corresponding to a particular impact sensor and being determined from the set of impact measurements corresponding to that particular impact sensor; and determine a plurality of local impact angles, each local impact angle corresponding to a particular impact sensor and being determined from the set of impact measurements corresponding to that particular impact sensor. The processor can be configured to determine the impact location based on the plurality of local impact magnitudes and the corresponding sensor locations. The processor can be configured to determine the overall impact magnitude based on the impact location and the plurality of local impact magnitudes. The processor can be further configured to determine an overall impact angle based on the impact location and the plurality of local impact angles.

In any embodiment, the plurality of impact sensors can include a plurality of inertial impact sensors. Each inertial impact sensor can be configured to generate a first directional impact measurement corresponding to a first direction, a second directional impact measurement corresponding to a second direction, and a third directional impact measurement corresponding to a third direction. The first direction can be defined as orthogonal to the second direction and third direction. The second direction can be defined as orthogonal to the first direction and third direction. The third direction is defined as orthogonal to the first direction and the second direction. The processor can be configured to determine the plurality of local impact magnitudes by, for each inertial impact sensor, determining a three-dimensional local impact magnitude based on the first directional impact measurement, the second directional impact measurement, and the third directional impact measurement generated by that inertial impact sensor.

In any embodiment, the article can extend longitudinally between a first end and a second end in the third direction. The processor can be configured to determine the plurality of local impact angles by, for each inertial impact sensor, determining a lateral local impact angle based on the first directional impact measurement and the second directional impact measurement.

In any embodiment, the processor can be configured to determine the impact location using a sinusoidal model of the plurality of local impact magnitudes.

In any embodiment, the processor can be configured to determine the overall impact angle by weighting the plurality of local impact angles. The plurality of local impact angles can be weighted based on the impact location and the corresponding sensor locations.

In any embodiment, the plurality of impact sensors can include a first inertial impact sensor and a second inertial impact sensor. The first inertial impact sensor can be fixed to a bottom portion of the article. The second inertial impact sensor can be fixed to a top portion of the article.

In any embodiment, the plurality of impact sensors includes a plurality of inertial impact sensors and the plurality of inertial impact sensors can be fixed to an interior of the article.

In any embodiment, at least one impact sensor can have a higher sensitivity for sensing impacts applied to the article than at least one other impact sensor.

In any embodiment, the plurality of impact sensors can include at least one accelerometer.

In any embodiment, the at least one accelerometer can include at least one triaxial accelerometer.

In any embodiment, the plurality of impact sensors can include at least one orientation sensor.

In any embodiment, the at least one orientation sensor can include at least one gyroscope.

In any embodiment, the plurality of impact sensors can include at least one accelerometer and at least one pressure sensor. The at least one pressure sensor can be operable to detect pressures at a plurality of pressure sensor locations on the article. The plurality of impact measurements can include a plurality of acceleration measurements from the at least one accelerometer and a plurality of pressure measurements from the at least one pressure sensor corresponding to the plurality of pressure sensor locations. The processor can be configured to determine the impact location based on at least one pressure measurement and the corresponding pressure sensor location. The processor can be configured to determine the overall impact magnitude based on the impact location and the plurality of acceleration measurements.

In any embodiment, the at least one pressure sensor can be fixed to an exterior of the article and can be provided by a flexible material that conforms to a shape of the article.

In any embodiment, the impact sensing system can further include a multiplexer. The multiplexer can be configured to receive at least two pressure measurements from the at least one pressure sensor and transmit the at least two pressure measurements to the processor. The processor can be configured to receive the plurality of pressure measurements from the at least one pressure sensor via the multiplexer.

In any embodiment, the impact sensing system can further include a wireless communication interface. The processor can be configured to transmit the impact location and the overall impact magnitude to an external device via the wireless communication interface.

In any embodiment, the impact sensing system can further include a computer-readable memory. The processor can be configured to store the impact location and the overall impact magnitude in the computer-readable memory.

In any embodiment, the article can be a pharmaceutical package.

In any embodiment, the article can be a beverage container.

In any embodiment, the processor can be configured to determine that the impact condition is satisfied by determining that at least one impact measurement of the plurality of impact measurements exceeds a predetermined impact value.

In any embodiment, the processor can be further configured to determine a vibration measurement based on the plurality of impact measurements. In accordance with an aspect of this disclosure, there is provided a method for sensing impacts applied to an article. The method can involve: receiving, by a processor, a plurality of impact measurements from a plurality of fixed sensor locations on the article, wherein each impact measurement is received from a corresponding fixed sensor location; determining, by the processor, from the plurality of impact measurements, that an impact condition is satisfied; determining, by the processor, an impact location based on the plurality of impact measurements and the corresponding fixed sensor locations; and determining, by the processor, an overall impact magnitude based on the impact location and the plurality of impact measurements.

In any embodiment, the plurality of impact measurements can include a location-specific set of impact measurements corresponding to each fixed sensor location. The method can further involve: determining, by the processor, a plurality of local impact magnitudes, each local impact magnitude corresponding to a particular fixed sensor location and determined from the location-specific set of impact measurements corresponding to that particular fixed sensor location; and determining, by the processor, a plurality of local impact angles, each local impact angle corresponding to a particular fixed sensor location and determined from the location-specific set of impact measurements corresponding to that particular fixed sensor location. The impact location can be determined based on the plurality of local impact magnitudes and the corresponding fixed sensor locations. The overall impact magnitude can be determined based on the impact location and the plurality of local impact angles. The method can further involve determining, by the processor, an overall impact based on the impact location and the plurality of local impact angles.

In any embodiment, the location-specific set of impact measurements corresponding to each fixed sensor location can include a location-specific set of inertial impact measurements. The location specific set of inertial impact measurements can include a first directional impact measurement corresponding to a first direction, a second directional impact measurement corresponding to a second direction, and a third directional impact measurement corresponding to a third direction. The first direction can be defined as orthogonal to the second direction and third direction. The second direction can be defined as orthogonal to the first direction and third direction. The third direction can be defined as orthogonal to the first direction and the second direction. The plurality of local impact magnitudes can be determined by, for each fixed sensor location, determining a three-dimensional local impact magnitude based on the first directional impact measurement, the second directional impact measurement, and the third directional impact measurement generated by that impact sensor.

In any embodiment, the article can extend longitudinally between a first end and a second end in the third direction. The plurality of local impact angles can be determined by, for each fixed sensor location, determining a lateral local impact angle based on the first directional impact measurement and the second directional impact measurement.

In any embodiment, the impact location can be determined using a sinusoidal model of the plurality of local impact magnitudes.

In any embodiment, the overall impact angle can be determined by weighting the plurality of local impact angles. The plurality of local impact angles can be weighted based on the impact location and the corresponding fixed sensor locations.

In any embodiment, the plurality of fixed sensor locations can include a first sensor location at a bottom portion of the article and a second sensor location at a top portion of the article.

In any embodiment, the plurality of fixed sensor locations can be located within an interior of the article.

In any embodiment, the plurality of impact measurements can include a plurality of acceleration measurements and a plurality of pressure measurements. The impact location can be determined based on at least one pressure measurement and the corresponding fixed sensor location. The overall impact magnitude can be determined based on the impact location and the plurality of acceleration measurements.

In any embodiment, the method can further involve transmitting, by the processor, the impact location and the overall impact magnitude to an external device using a wireless communication interface.

In any embodiment, the method can further involve storing, by the processor, the impact location and the overall impact magnitude using a computer-readable memory.

In any embodiment, the article can be a pharmaceutical package.

In any embodiment, the article can be a beverage container.

In any embodiment, the impact condition can be satisfied when at least one impact measurement of the plurality of impact measurements exceeds a predetermined impact value.

In any embodiment, the method can further involve determining, by the processor, a vibration measurement based on the plurality of impact measurements.

In accordance with an aspect of this disclosure, there is provided an impact sensing system for an article. The article can extend between a first end and a second end. The impact sensing system can include a first impact sensor, a second impact sensor, and a processor. The first impact sensor can be fixed to the article proximate the first end. The first impact sensor can be configured to generate a first set of impact measurements in response to an impact applied to the article. The second impact sensor can be fixed to the article proximate the second end. The second impact sensor can be configured to generate a second set of impact measurements in response to the impact applied to the article. The processor can be coupled to the first impact sensor and to the second impact sensor. The processor can be configured to: receive the first set of impact measurements from the first impact sensor; determine a first impact magnitude from the first set of impact measurements; determine a first impact angle from the first set of impact measurements; receive the second set of impact measurements from the second impact sensor; determine a second impact magnitude from the second set of impact measurements; determine a second impact angle from the second set of impact measurements; determine an impact location using the first impact magnitude and the second impact magnitude; determine an overall impact magnitude using the impact location, the first impact magnitude and the second impact magnitude; and determine an overall impact angle using the impact location, the first impact angle, and the second impact angle.

In any embodiment, the first impact sensor can include a first tri-axial accelerometer and the second impact sensor can include a second tri-axial accelerometer.

In any embodiment, the first tri-axial accelerometer can have a first sensitivity and the second tri-axial accelerometer can have a second sensitivity. The first sensitivity can be at least five times greater than the first sensitivity.

In any embodiment, the first impact sensor can include an orientation sensor.

In any embodiment, the orientation sensor can include a gyroscope.

In any embodiment, the first impact sensor and the second impact sensor can be mounted to an interior of the article. At least one pressure sensor can be mounted to an exterior of the article.

It will be appreciated that the aspects and embodiments may be used in any combination or sub-combination. Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
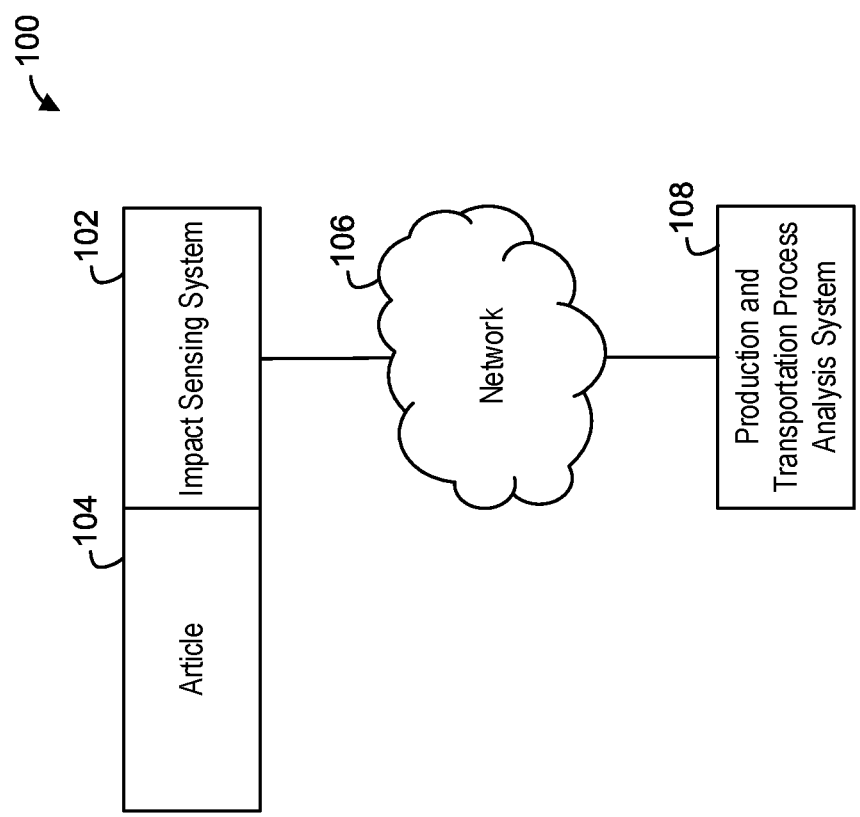
FIG. 1 is a block diagram of an article monitoring system in accordance with an embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high-level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

In the description herein, the term "article" is used to refer to an object that is being manufactured, produced, packaged, transported, and/or distributed etc. As used herein, the term "article" may refer to a product and/or a package containing a product. An "article" may refer to a product that is intended to be received/used by a retailer, distributor and/or end-user and/or the entire package that may be received by a retailer, distributor and/or end-user including external packaging and/or containers and the goods/products contained therein. In the description herein, an "article" may be refer to an actual package and/or product and/or a replica of the actual package and/or product.

During a production and transportation process, an article may be subject to a number of forces that can potentially damage the article. Depending on the severity of the damage, it may not be possible to sell the article, for example, due to regulatory and/or customer requirements. Identifying the source(s) of damage in the production and transportation process can be crucial in minimizing or preventing damage to articles in the future. This can help maximize production yields and minimize lost costs.

It is often difficult to precisely identify the source of damage to an article along the chain of a production and transportation process. The production process for an article can be extremely complex and may include multiple production steps involving various pieces of equipment or machinery. Inspecting each manufacturing step and each corresponding piece of equipment in the production process can be time consuming and may result in costly downtime in the production process. The transportation process for an article may be equally complex, for example, involving multiple different couriers and modes of transport over large geographical areas and extended periods of time.

The embodiments described herein provide systems and methods for sensing impacts applied to an article. The systems and methods described herein may be applied with articles undergoing one or more stages of a production and/or transportation process. As described herein, an impact sensing system can be coupled to an article. For example, the impact sensing system may be coupled to the article while the article undergoes one or more stages of a production and/or transportation process.

An impact sensing system can be configured to detect impacts applied to the associated article. The impact sensing system may be configured to determine various characteristics of impacts applied to the associated article. For example, the impact sensing system may be configured to determine a magnitude of the applied impact. Alternately or in addition, the impact sensing system may be configured to determine a location of the applied impact—i.e. a location on the article where the impact occurred. Alternately or in addition, the impact sensing system may be configured to determine an angle of the applied impact. Identifying and characterizing impacts on the article may facilitate identification of potential causes of damage to the article.

In embodiments described herein, an impact sensing system can include one or more sensors usable to measure an impact. As will be described in greater detail below, the impact sensing systems and methods may use a plurality of impact sensors positioned at various sensor locations on an article. The measurements from the impact sensors may be used to determine the magnitude and location of impacts applied to the article.

The impact sensing systems described herein may be compatible with articles having a relatively small form factor. For example, the impact sensing systems may be coupled with a pharmaceutical package, such as, but not limited to, a syringe, a cartridge, a vial, a pen, and/or an ampule.

In embodiments described herein, impact sensing systems may use a relatively small number of sensors to accommodate articles with a small form factor, such as pharmaceutical packages. In embodiments described herein, impact sensing systems can be configured to accurately determine the magnitude and location of impacts applied to an article, even with a limited number of sensors. For example, the impact sensing systems may include as few as two impact sensors in some embodiments.

The embodiments described herein can be used to identify problems in a production and transportation process, such as faulty or unreliable equipment that can cause damage to articles. The impact sensing systems described herein may be used to optimize production and transportation processes for a product, by minimizing the damage to the product and/or package. This can help maximize production yield.

Referring now to FIG. 1, there is shown a block diagram of an example article monitoring system 100 in accordance with an embodiment. As shown in the example of FIG. 1, the article monitoring system 100 includes an impact sensing system 102 coupled to an article 104. The impact sensing system 102 is also in communication with a production and transportation process analysis system 108 via a network 106.

The impact sensing system 102 can be coupled to article 104 in order to detect impacts applied to the article 104. The impact sensing system 102 can include one or more sensors. The sensors can be attached to the article 104 at one or more sensor locations. Each sensor may produce impact measurement data in response to impacts applied to the article 104.

The impact sensing system 102 can be configured to process the impact measurement data received from the sensors. The impact sensing system 102 may determine impact characteristics based on the received measurement data. For example, the impact sensing system 102 may be configured to determine a magnitude of the impact applied to article 104. Alternately or in addition, the impact sensing system 102 may be configured to determine a location of the impact on the article 104—i.e. a location on the article 104 where the impact occurred. Alternately or in addition, the impact sensing system may be configured to determine an angle of the impact on the article 104.

In general, the article 104 may be any object for which impacts are desired to be measured. In many cases, the article 104 may be an object expected to undergo a production and/or transportation process. For example, the article 104 may refer to a package for a pharmaceutical product, such as, but not limited to, a bottle, a vial, a syringe, a cartridge, a vial, a pen, or an ampule. Alternately, the article may be a container for a beverage, such as, but not limited to, a bottle or a can.

The article 104 may be an actual package and/or product, and/or a replica of the package and/or product. A replica may mimic various properties of the actual packaging and/or product. For example, the replica can have the same (or similar) shape, size, and/or weight as the actual packaging and/or product. The replica may have the same (or similar) mechanical properties as the actual package or product, such as, but not limited to, strength, ductility, hardness, impact resistance, or fracture toughness. For example, for a pharmaceutical bottle, the article 104 can be the actual pharmaceutical bottle or a replica of the pharmaceutical bottle that has similar properties as the actual pharmaceutical bottle.

The location of mounting of the impact sensing system 102 may vary depending on the nature particular article 104. In some cases, the impact sensing system 102 may be mounted to the exterior of an article 104. For instance, the article 104 may be a container or vessel enclosing a substance or object of interest to an end-user. The impact sensing system 102 may then be positioned on the exterior of the article 104 to detect impact that may compromise the integrity of the container or vessel.

Alternately or in addition, the impact sensing system 102 may be disposed within an interior of the article 104. For example, where the article 104 includes packaging usable to enclose a product, the impact sensing system 102 may be positioned within an interior of the packaging. This may allow the impact sensing system 102 to more accurately measure impacts delivered to a product positioned within the packaging.

The impact sensing system 102 can communicate with the production and transportation process analysis system 108 via the network 106. The network 106 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the impact sensing system 102 and transportation process analysis system 108.

The impact sensing system 102 can send and receive various data to and from the production and transportation process analysis system 108 via the network 106. For example, the impact sensing system 102 may transmit data related to impacts applied to the article 104. In some cases, the impact sensing system 102 may send raw sensor data to production and transportation process analysis system 108.

This may allow the analysis system 108 to further evaluate the nature of the impacts applied to the article 104. For example, the impact sensing system 102 may transmit impact measurement data received from one or more sensors. The analysis system 108 may then evaluate the impact measurement data to determine characteristics of the impact (e.g. location, magnitude, angle or direction etc.)

Alternately or in addition, the impact sensing system 102 may transmit processed data to the analysis system 108. The processed data may be generated based on raw sensor data from one or more sensors. For example, the impact sensing system 102 may transmit impact magnitude data, impact location data, and/or impact angle data generated based on the impact measurement data received from one or more sensors.

The analysis system 108 can be configured to communicate with a plurality of impact sensing systems 102. Each impact sensing system 102 can be coupled to a corresponding article 104. The analysis system 108 may receive impact data related to each article 104 from the corresponding impact sensing systems 102.

The analysis system 108 can be configured to perform various operations using the data received from the impact sensing system 102. In some examples, analysis system 108 may generate reports and/or visualizations, based on the received data. For instance, the analysis system 108 may generate aggregate impact reports based on data received from a plurality of impact sensing systems 102.

The analysis system 108 can be configured to identify particular locations on an article 104 that are associated with impact events. The analysis system 108 may generate a graphical visualization of the magnitude and/or location of one or more impacts on the article 104. The analysis system 108 may also generate aggregate data related to a plurality of impacts, such as locations on the article with a large number of impacts and/or locations of impacts with large magnitude etc.

In some embodiments, the analysis system 108 may receive impact measurement data from the impact sensing system 102. The analysis system 108 may use the impact measurement data to determine the magnitude and/or location of impacts applied to the article 104.

Optionally, the impact sensing system 102 co-located with the article 104 may not analyze the impact measurement data locally. Rather, the analysis system 108 may receive the impact measurement data from the impact sensing system 102. For example, the impact sensing system 102 may transmit the impact measurement data to the analysis system 108 using a wired or wireless communication module. Alternately or in addition, the impact measurement data may be stored in memory on impact sensing system 102. The measurement data may then be retrieved from the impact sensing system 102 and provided to analysis system 108. The analysis system 108 may then process the impact measurement data to characterize the impacts (e.g. determine impact magnitude, location, angle etc.).

The analysis system 108 may also correlate the impact data with steps or locations along a production and/or transportation process. For instance, the impact data may be associated with article location data. The article location data may define a location of the article directly, e.g. using position tracking techniques such as GPS or more local position tracking techniques using RFID signals, Bluetooth, or Wi-Fi. Alternately or in addition, the article location data may include data usable to infer the article location, such as the date and/or time at which the impact data was generated. The analysis system 108 can then correlate the article location data and impact data to identify portions of the production and/or transport process causing impacts.

The analysis system 108 may include a processor, a data storage, and a communication interface (not shown), and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. In some cases, the analysis system 108 can be provided by multiple components over a wide geographic area.

In some embodiments, impact sensing system 102 and/or the analysis system 108 can determine one or more vibration measurements from impact measurement data. For example, the impact sensing system 102 may identify an impact measurement as vibration measurement when the impact measurement is within an impact value range. For instance, the impact measurement may have a magnitude that is too small to correspond to an impact, but is too high to only correspond to noise. The impact sensing system 102 and/or the analysis system 108 may define one or more impact thresholds. For example, a noise impact threshold may be defined to identify impact measurement values that are so low in magnitude as to be considered noise. Alternately or in addition, a vibration threshold may be defined to differentiate between measurement data indicating a vibration magnitude and a larger impact magnitude. The impact and vibration thresholds may vary depending on the deployment environment and/or particular implementation of the impact sensing system 102. In some cases, a vibration frequency may be determined based on the one or more vibration measurements.

Although only one impact sensing system 102 and article 104 is shown in FIG. 1 for ease of illustration, there can be any number of impact sensing systems 102, each coupled to a respective article 104, and operable to sense impacts applied to the respective article 104 and communicate with the analysis system 108 via the network 106.

Figure 2:
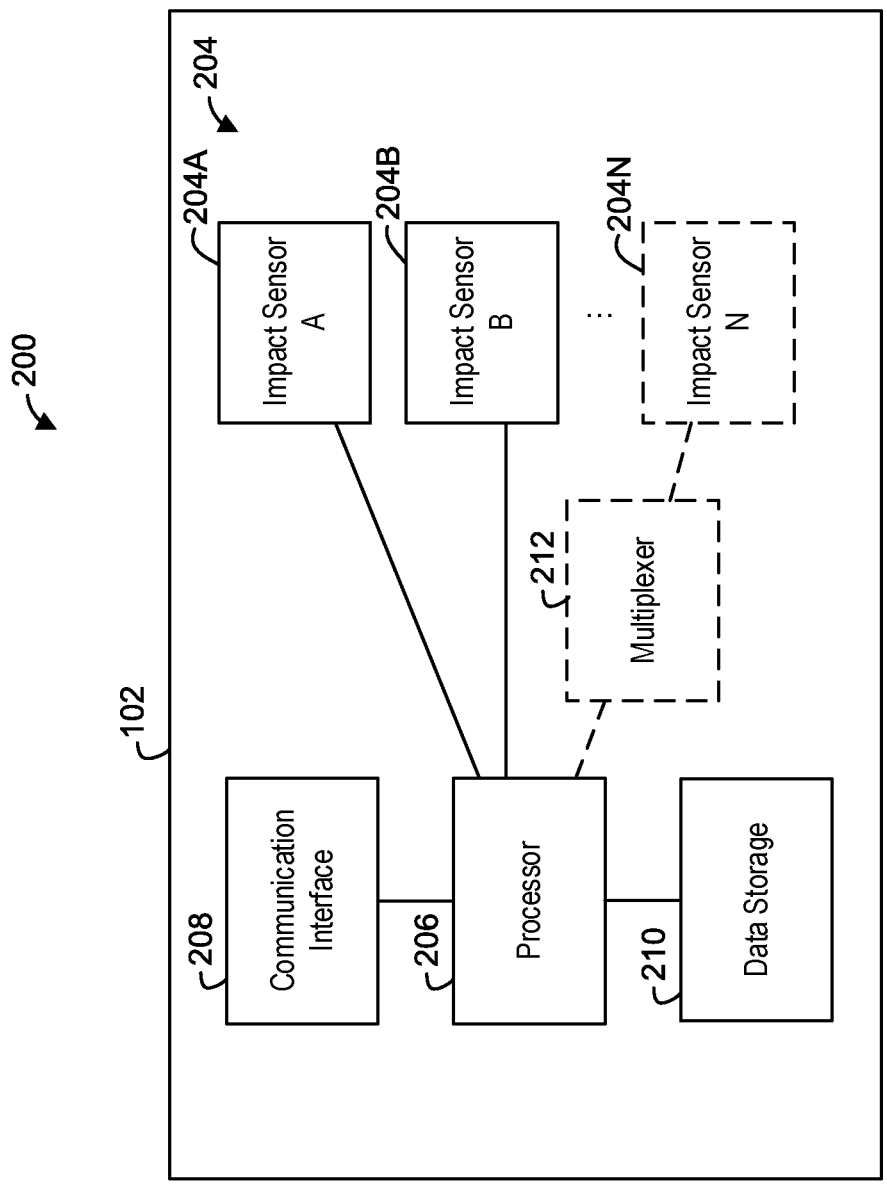
FIG. 2 is a block diagram of an example impact sensing system in accordance with an embodiment.

Referring now to FIG. 2, there is shown a block diagram 200 of an example impact sensing system 102. In the example illustrated, impact sensing system 102 includes impact sensors 204, a processor 206, a communication interface 208, and a data storage 210. Each of the components of the impact sensing system 102 may be disposed within an interior of the article 104.

The impact sensors 204 can generate impact measurement data, in response to impacts applied to the article 104. The impact sensors 204 may include various types of sensors, such as, but not limited to, inertial measurement sensors, pressure sensors, and/or combinations thereof. Various types of inertial measurement units may be used, such as accelerometers, triaxial accelerometers, orientation sensors, gyroscopes, and/or combinations thereof. For example, the inertial measurement units may be MEMS accelerometers, such as an MPU6050 accelerometer, an ICM-20649 accelerometer, or an ADXL372 accelerometer. In another example, the inertial measurement units may be piezo accelerometers, such as a TE834 accelerometer.

Various types of pressure sensors may be used. The pressure sensors may include piezo-resistive sensors, piezoelectric sensors, capacitive sensors, strain gauges, load cells, and/or combinations thereof. For example, a plurality of pressure sensors may be combined into a pressure sensor array, such as the pressure sensor array described in U.S. Pat. No. 9,488,538. The pressure sensors may be mounted to a flexible substrate. This may facilitate conforming the pressure sensors to the shape of the article 104.

Each impact sensor 204 can be coupled to the article 104 at a respective sensor location. As explained above, impact sensors 204 may be disposed at various locations of an article 104. For instance, the impact sensors 204 may be positioned within the interior of the article 104 or on the exterior of the article 104.

In some cases, the impact sensors 204 may be rigidly fixed to the article 104. Each impact sensor 204 can be fixed to the article 104 at its respective sensor location. This may minimize or eliminate movement of the impact sensors 204 relative to the article 104. Movement of the impact sensors 204 may result in undesired artifacts in the impact measurement data (e.g., measuring the movement of the impact sensors 204, rather than impacts to the article 104). By securing the impact sensors 204 to the article 104 fixed in the sensor locations, these artifacts may be reduced or eliminated.

Figure 11:
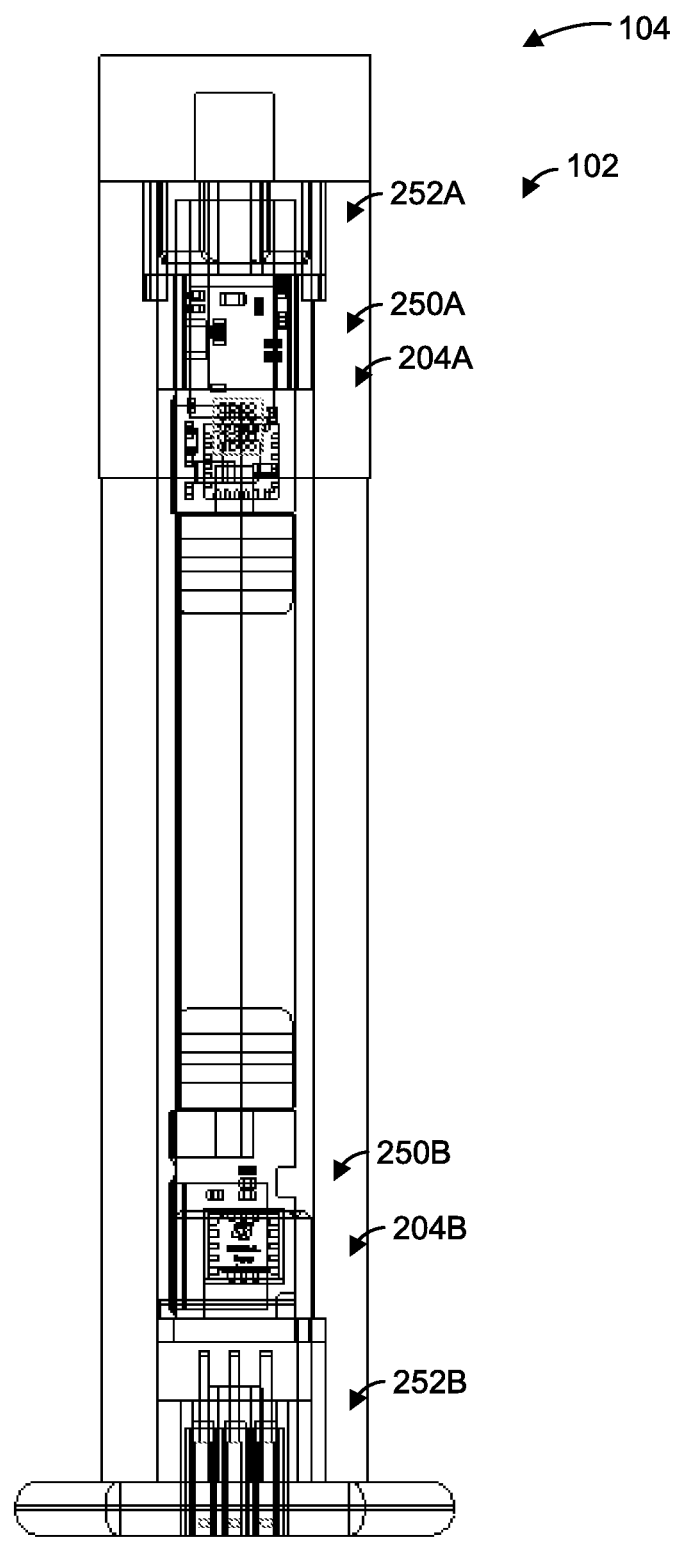
FIG. 11 is a perspective view of another example impact sensing system in accordance with an embodiment.

For example, referring now to FIG. 11, there is shown an example of an impact sensing system 102 coupled to an article 104. The impact sensing system 102 includes two impact sensors 204A and 204B. As shown in the example of FIG. 11, impact sensor 204A is attached to circuit board 250A and impact sensor 204B is attached to circuit board 250B. Each circuit board 250A and 250B is fixed to the article 104, thereby securing the corresponding impact sensors 204A and 204B to the article 104.

As shown in the example illustrated in FIG. 11, the article 104 can include support structures 252A and 252B. Each support structure 252A and 252B can be configured to receive and secure a corresponding one of the circuit boards 250A and 250B. Each support structure 252A and 252B can have a support structure shape that corresponds to a circuit board shape of the corresponding one of the circuit boards 250A and 250B. For example, support structure 252A may be shaped to correspond to circuit board 250A and support structure 252B may be shaped to correspond to circuit board 250B.

The support structures 252A and 252B can be configured to position and orient the circuit boards 250A and 250B on article 104. That is, the support structure 252A can be configured to secure the circuit board 250A to article 104 in a pre-defined position. Alternately or in addition, the support structure 252A can be configured to secure the circuit board 250A to article 104 with a pre-defined orientation. For example, the support structure 252A can be shaped to receive the circuit board 250A in a pre-defined orientation.

Similarly, the support structure 252B can be configured to secure the circuit board 250B to article 104 in a pre-defined position. Alternately or in addition, the support structure 252B can be configured to secure the circuit board 250B to article 104 with a pre-defined orientation. For example, the support structure 252B can be shaped to receive the circuit board 250B in a pre-defined orientation.

In some cases, each support structure 252A/252B can define a board receiving area (e.g. a slot or receptacle) that can receive the corresponding circuit board 250A/250B at the corresponding fixed sensor location. For example, the board receiving area can be shaped to mate with the corresponding circuit board 250A/250B. The board receiving area may be configured to secure the corresponding circuit board 250A/250B in a press fit at the pre-defined location and/or pre-defined orientation. Optionally, an adhesive may be applied between the support structures 252A and 252B and the corresponding circuit boards 250A and 250B to further fix the circuit boards 250A and 250B to the article 104.

Referring back to FIG. 2, in some examples, one or more interior impact sensors 204 may be positioned within the interior of an article 104 while one or more exterior impact sensors are positioned on the exterior of the article 104. For example, one or more inertial impact sensors can be positioned within the interior of the article 104 while one or more pressure sensors can be positioned on the exterior of the article 104.

The impact sensors 204 may be positioned so that various impacts occurring at different locations of the article 104 can be sensed. For example, a first impact sensor 204A may be mounted to a top portion of the article 104 and a second impact sensor 204B may be mounted to a bottom portion of the article 104. Impact measurements from the first impact sensors 204A and second impact sensor 204B may be used to detect and characterize impacts throughout the article 104, as described herein below. In some examples, a pair of impact sensors may be sufficient to characterize impacts at all locations along the article 104.

In some examples, the impact sensors 204 may have different sensitivities for detecting impacts applied to the article 104. For example, impact sensor 204A may have a higher sensitivity than impact sensor 204B. In some cases, higher sensitivity sensors may be disposed at locations where impacts are expected frequently occur. Alternately or in addition, higher sensitivity sensors may be positioned at locations on the article 104 where low intensity impacts may be expected (e.g. where lower sensitivity impact sensors may be unable to detect impacts).

Although only three impact sensors 204 (e.g., first impact sensor 204A, second impact sensor 204B, and third impact sensor 204N) are shown in FIG. 2 for ease of illustration, it should be appreciated that the impact sensing system 102 can include any number of impact sensors 204. In some embodiments, the impact sensing system 102 may include only two impact sensors 204. In some embodiments, the impact sensing system 102 may include only three impact sensors 204. In other examples, greater numbers of impact sensors 204 may be used.

The processor 206 may be any suitable processors, controllers and/or digital signal processors that can provide sufficient processing power depending on the configuration, purposes and requirements of the impact sensing system 102. In some embodiments, the processor 206 can include more than one processor with each processor being configured to perform different dedicated tasks.

The processor 206 can be configured to control the operation of the impact sensing system 102. For example, the processor 206 can control operation of the impact sensors 104. The processor 206 can also be configured to control communications between impact sensing system 102 and external devices, such as an analysis system 108.

In some examples, the processor 206 may be configured to process the receive impact measurement data from the impact sensors 204. For example, processor 206 may be configured to determine various impact characteristics, such as impact magnitude, impact location, and/or impact angle.

The communication interface 208 may be any interface that enables the impact sensing system 102 to communicate with other devices and systems, such as, but not limited to, the production and transportation process analysis system 108 via the network 106. In some embodiments, the communication interface 208 can include at least one of a serial port, a parallel port or a USB port. The communication interface 208 may also include at least one of an Internet, Local Area Network (LAN), Ethernet, Firewire, modem or digital subscriber line connection. In some embodiments, the communication interface 208 may be a wireless communication interface, and the processor 206 can transmit various data to other devices or systems via Bluetooth, WiFi, or other suitable wireless communication standard.

In some cases, communication interface 208 may be omitted. For example, where the data storage 210 is a removable data storage device, the communication interface 208 may not be needed.

The data storage 210 may store various data, such as, but not limited to impact measurement data from the impact sensors 204. In some examples, the data storage device 210 may store processed data determined by the processor, such as various impact characteristics. The data storage 210 can include RAM, ROM, one or more hard drives, one or more flash drives or some other suitable data storage elements such as disk drives, etc. In some cases, the data storage 210 may be removable from the sensing system 200.

Optionally, the impact sensing system 102 can include a multiplexer 212. The multiplexer 212 can receive impact measurement data via multiple inputs from the impact sensors 204. The multiplexer 212 can provide the impact measurement data via fewer outputs to the processor 206. The multiplexer 212 can provide impact measurement data from a large number of impact sensors 204 to a processor 206 that may have limited inputs. For example, the multiplexer may receive two or more pressure measurements from a pressure sensor and provide the pressure measurements to the processor 206. Although the multiplexer 212 is shown in FIG. 2 as being coupled to only one impact sensor 204N, it should be appreciated that the multiplexer 212 can be coupled to any number of impact sensors 204.

Figure 3A:
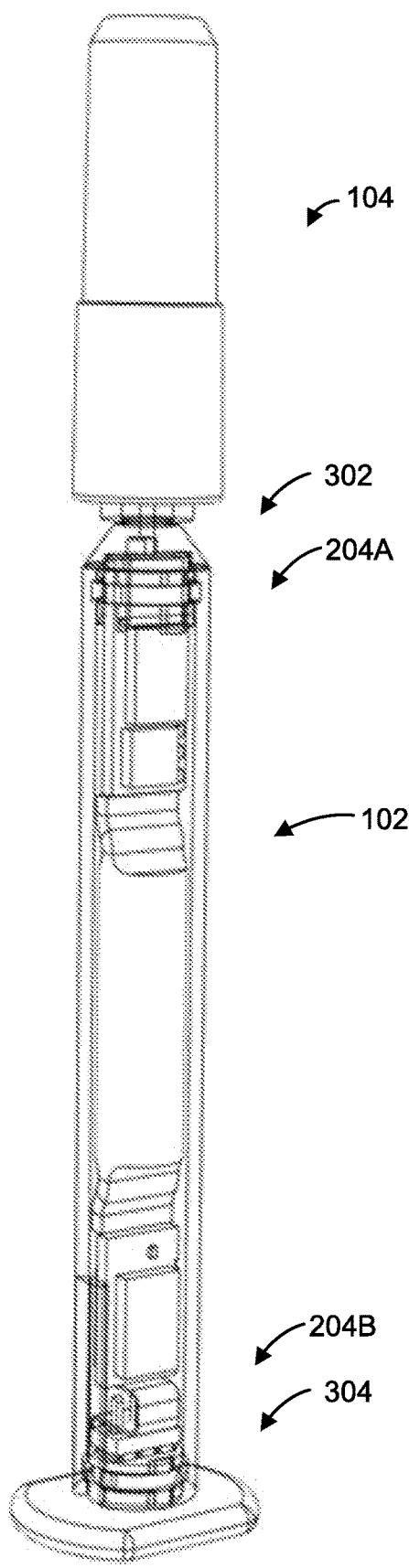
FIG. 3A is an perspective view of an example impact sensing system in accordance with an embodiment.

Referring now to FIG. 3A, there is shown an example of an impact sensing system 102 that is coupled to an article 104. In the example shown in FIG. 3A, the article 104 is a syringe. As shown in FIG. 3A, the article 104 extends between a first end 302 and a second end 304. A first impact sensor 204A is fixed to the article 104 proximate the first end 302. A second impact sensor 204B is fixed to the article 104 proximate the second end 304.

The first impact sensor 204A and the second impact sensor 204B can be mounted to an interior of the article 104. In the example illustrated, first impact sensor 204A includes an accelerometer, in this case a first tri-axial accelerometer. The second impact sensor 204B can also include an accelerometer, in this case a second tri-axial accelerometer.

In some cases, one of the accelerometers may have a higher level of sensitivity. For example, the first accelerometer may have a first sensitivity while the second accelerometer has a second sensitivity. The first sensitivity may be greater than the second sensitivity (or vice versa). In some examples, the first sensitivity may be twice the second sensitivity (or vice versa). In some examples, the first sensitivity may be five times the second sensitivity (or vice versa). In some examples, the first sensitivity may be ten times the second sensitivity (or vice versa).

At least one of the impact sensors may also include an orientation sensor, such as, but not limited to, a gyroscope. In the example illustrated, the first impact sensor 204A includes an orientation sensor, namely a gyroscope.

Optionally, at least one pressure sensor (not shown) can be mounted to an exterior of the article 104.

Figure 3B:
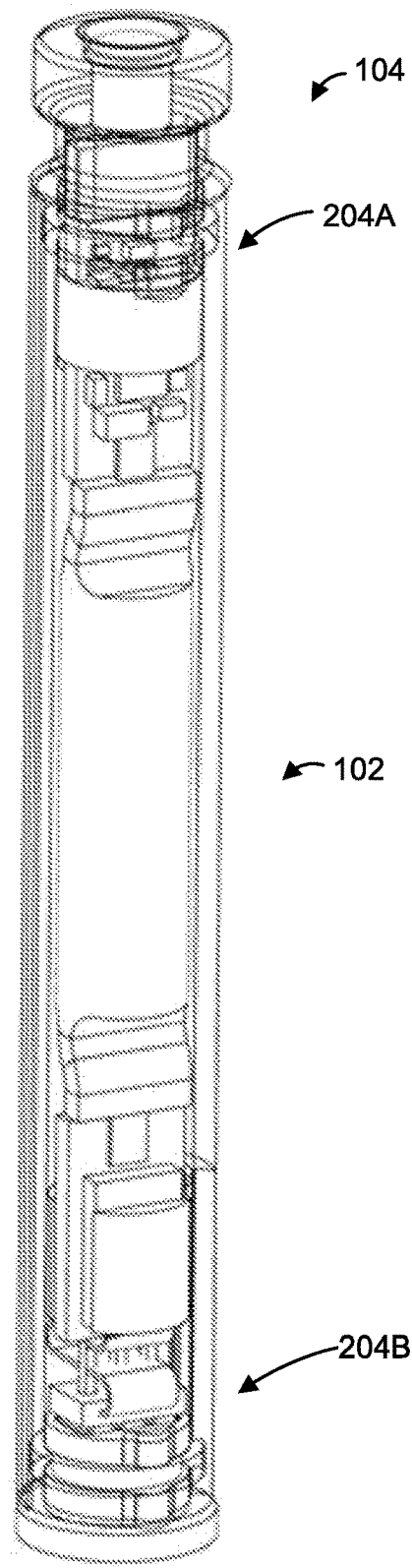
FIG. 3B is a perspective view of another example impact sensing system in accordance with an embodiment.

Referring now to FIG. 3B, there is shown another example of an impact sensing system 102 that is coupled to an article 104. In the example shown in FIG. 3B, the article 104 is a cartridge for an auto-injector device. Similar to FIG. 3A, a first impact sensor 204A is fixed to the article 104 proximate a first end 302, and a second impact sensor 204B is fixed to the article 104 proximate a second end 304.

Figure 3C:
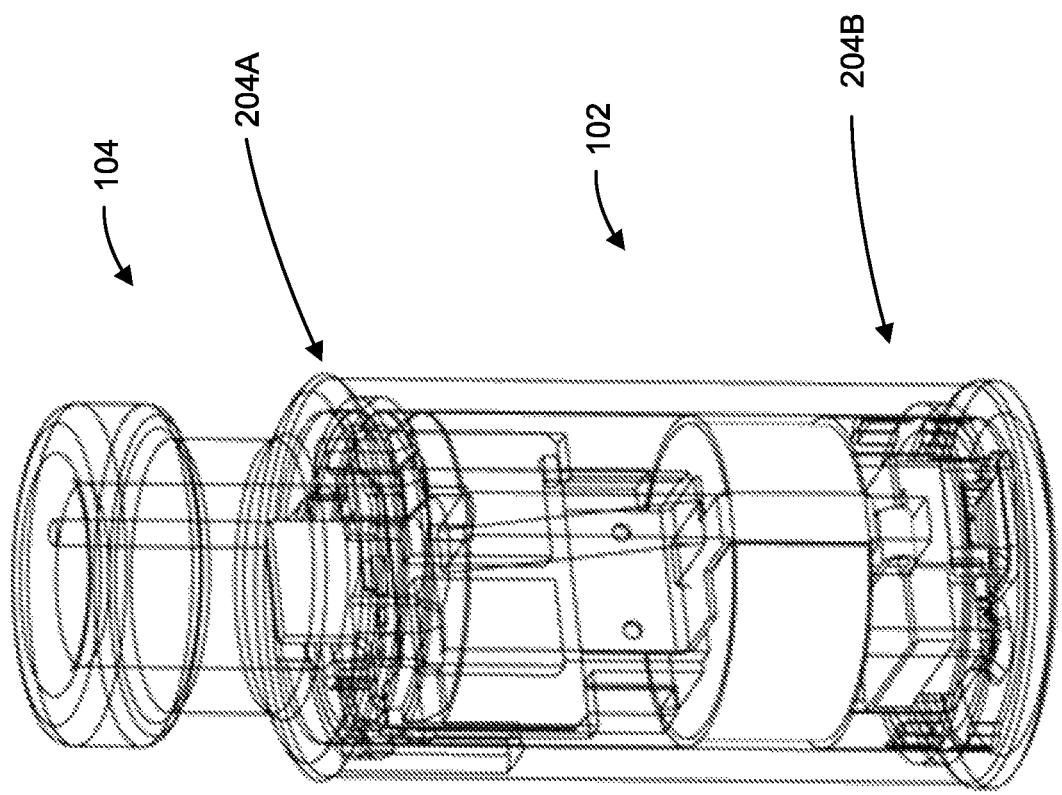
FIG. 3C is a perspective view of another example impact sensing system in accordance with an embodiment.

Referring now to FIG. 3C, there is shown another example of an impact sensing system 102 that is coupled to an article 104. In the example shown in FIG. 3C, the article 104 is a vial. Similar to FIGS. 3A and 3B, a first impact sensor 204A is fixed to the article 104 proximate a first end 302, and a second impact sensor 204B is fixed to the article 104 proximate a second end 304.

Figure 3D:
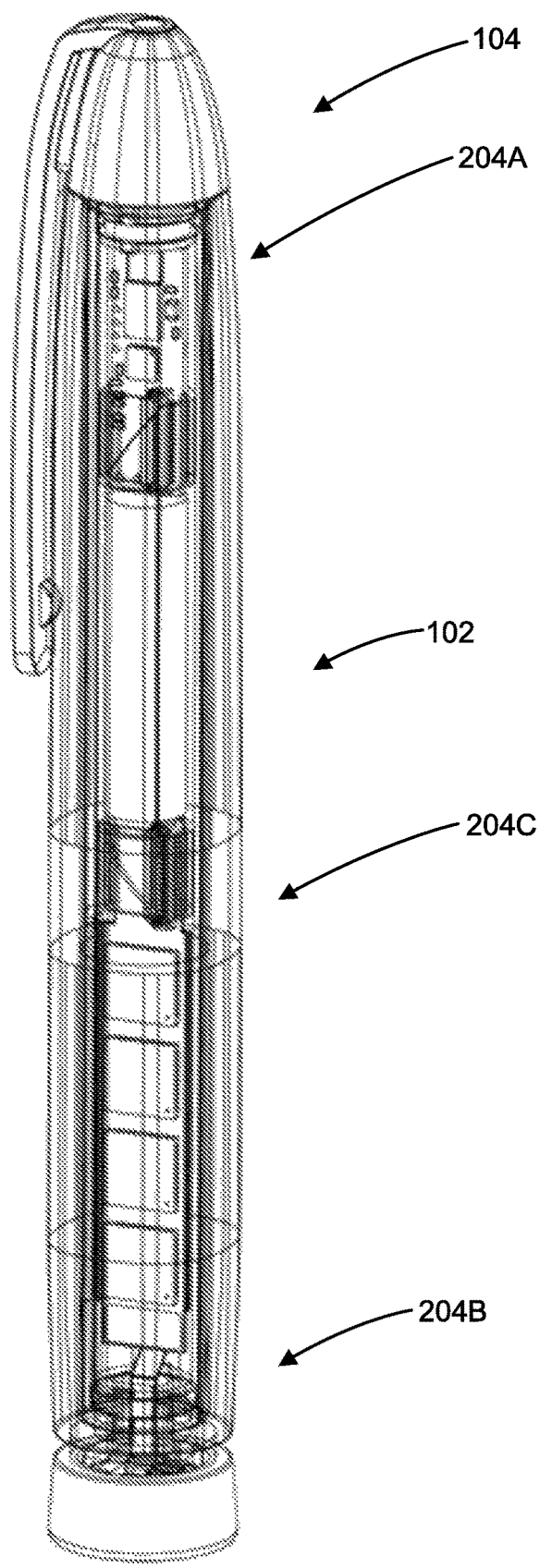
FIG. 3D is a perspective view of another example impact sensing system in accordance with an embodiment.

Referring now to FIG. 3D, there is shown another example of an impact sensing system 102 that is coupled to an article 104. In the example shown in FIG. 3D, the article 104 is a pen. Similar to FIGS. 3A, 3B, and 3C, a first impact sensor 204A is fixed to the article 104 proximate a first end 302, and a second impact sensor 204B is fixed to the article 104 proximate a second end 304. However, as shown in FIG. 3D, a third impact sensor 204C can be fixed to the article in between the first impact sensor 204A and the second impact sensor 204B. Including a third impact sensor 204C may facilitate identifying and characterizing impacts along the length of the article 104.

Figure 3E:
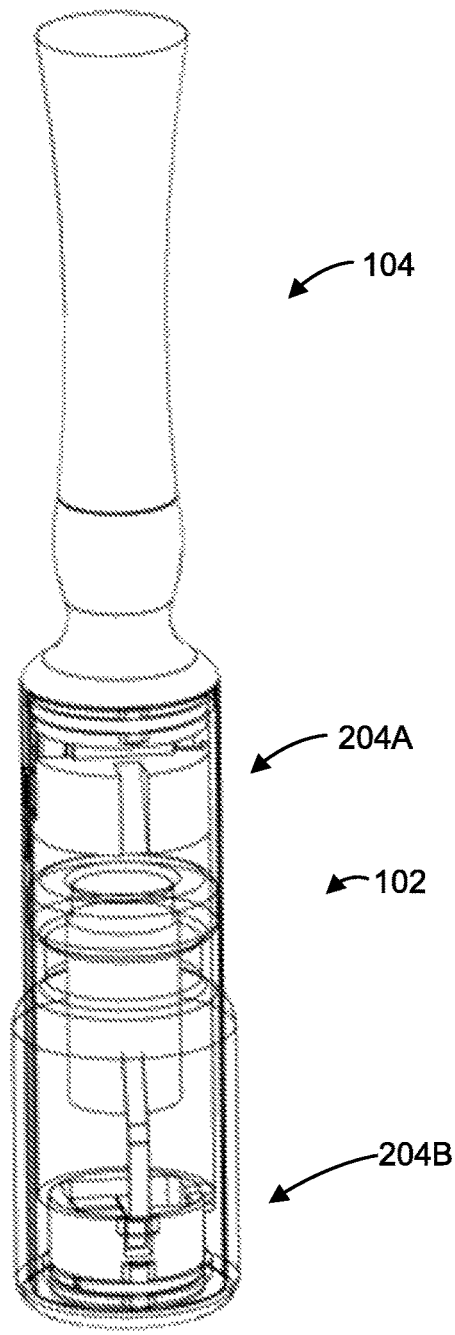
FIG. 3E is a perspective view of another example impact sensing system, in accordance with an embodiment.

Referring now to FIG. 3E, there is shown another example of an impact sensing system 102 that is coupled to an article 104. In the example shown in FIG. 3E, the article 104 is an ampule. Similar to FIGS. 3A, 3B, and 3C, a first impact sensor 204A is fixed to the article 104 proximate a first end 302, and a second impact sensor 204B is fixed to the article 104 proximate a second end 304

Figure 4:
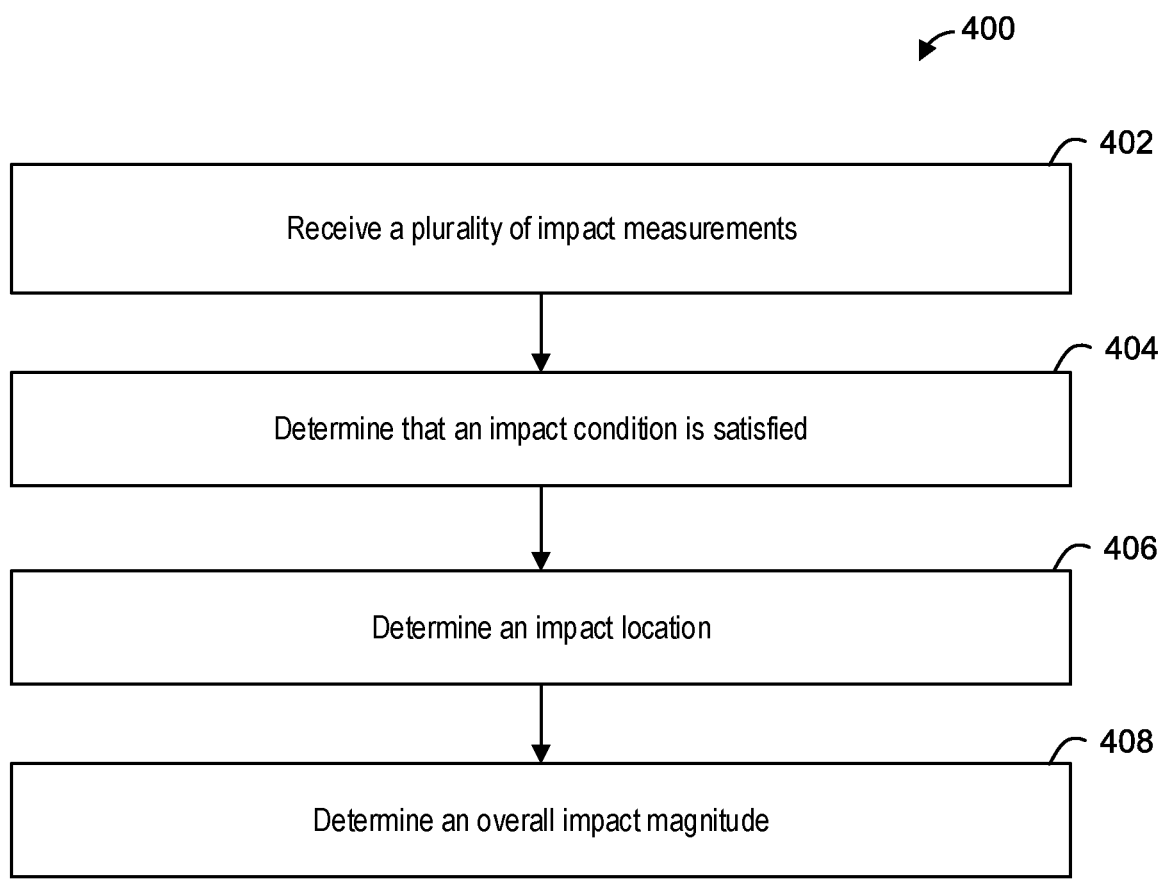
FIG. 4 is a flow chart of an example method of operating an impact sensing system in accordance with an embodiment.

Referring now to FIG. 4, shown therein is an example method 400 for sensing impacts applied to an article 104. The method 400 is an example of an impact detection method that may be implemented using the impact sensing system 102.

Method 400 will be described below with reference to the impact sensing system 102 for ease of exposition. However, it should be appreciated that one or more steps of the method 400 may be implemented by the analysis system 108.

At 402, processor 206 can receive a plurality of impact measurements. The processor 206 can receive the plurality of impact measurements from the impact sensors 204. In some embodiments, the processor 206 may receive the impact measurements from the impact sensors 204 via the multiplexer 212.

The processor 206 may receive impact measurements from the impact sensors 204 on a continual or ongoing basis. For instance, the processor 206 may receive impact measurements from the sensors 204 intermittently, as the sensors generate measurement data.

At 404, the processor 206 can determine that an impact condition is satisfied. The processor 206 may determine that an impact condition is satisfied when at least one impact measurement exceeds a predetermined impact threshold. For example, the processor 206 may identify an impact condition when an acceleration measurement from an accelerometer exceeds a predetermined acceleration value. In another example, the processor 206 can identify an impact condition when a pressure measurement from a pressure sensor exceeds a predetermined pressure value.

At 406, the processor 206 can determine an impact location. The processor 206 can determine the impact location based on the plurality of impact measurements and corresponding sensor locations of the impact sensors 204. For example, for a plurality of pressure measurements, the processor 206 may determine the impact location based on the pressure measurement with the largest magnitude and the sensor location of the pressure sensor associated with that pressure measurement.

In some embodiments, the processor 206 may determine the impact location using an impact location model. For example, the model may include expected impact measurement values for given sensor locations in response to an impact from a particular impact location. The processor 206 can determine the impact location based on the actual impact measurements and the model, for example, by comparing the actual impact measurements with the predicted impact measurements. For instance, the processor 206 can determine an impact location that, based on predictions from the model, approximately match the actual impact measurements with the predicted impact measurements. In some embodiments, the model can receive the impact measurements and sensor locations as an input, and output the impact location.

In some examples, the model may be stored in data storage device 210 and used by the processor 206 to identify the impact location. For instance, the model may be stored as a look-up table in storage device 210.

At 408, the processor 206 can determine an overall impact magnitude. The processor 206 can determine the overall impact magnitude based on the impact location and the plurality of impact measurements. For example, the processor 206 may determine the overall impact magnitude by weighting the impact measurements based on the corresponding sensor locations and the impact location. For example, impact measurements from sensor locations that are relatively far from the impact location may be weighted less than impact measurements from sensor locations that are relatively close to the impact location.

In some embodiments, the processor 206 may determine the overall impact magnitude using an impact magnitude model. For example, the impact magnitude model may predict impact measurement values for particular sensor locations, for a particular impact at a particular impact location and having a particular impact magnitude. The processor 206 can determine the overall impact magnitude based on the actual impact measurements and the model, for example, by comparing the actual impact measurements with the predicted impact measurements. For instance, the processor 206 can determine an impact magnitude that, based on the predictions from the impact magnitude model using the impact location, approximately match the actual impact measurements with the predicted impact measurements. In some embodiments, the processor 206 may use the impact measurements, sensor locations, and impact location as inputs to the model and determine the overall impact magnitude as an output. For example, the impact magnitude model may be stored as a look-up table on the impact sensing system 102 and/or analysis system 108.

Figure 5:
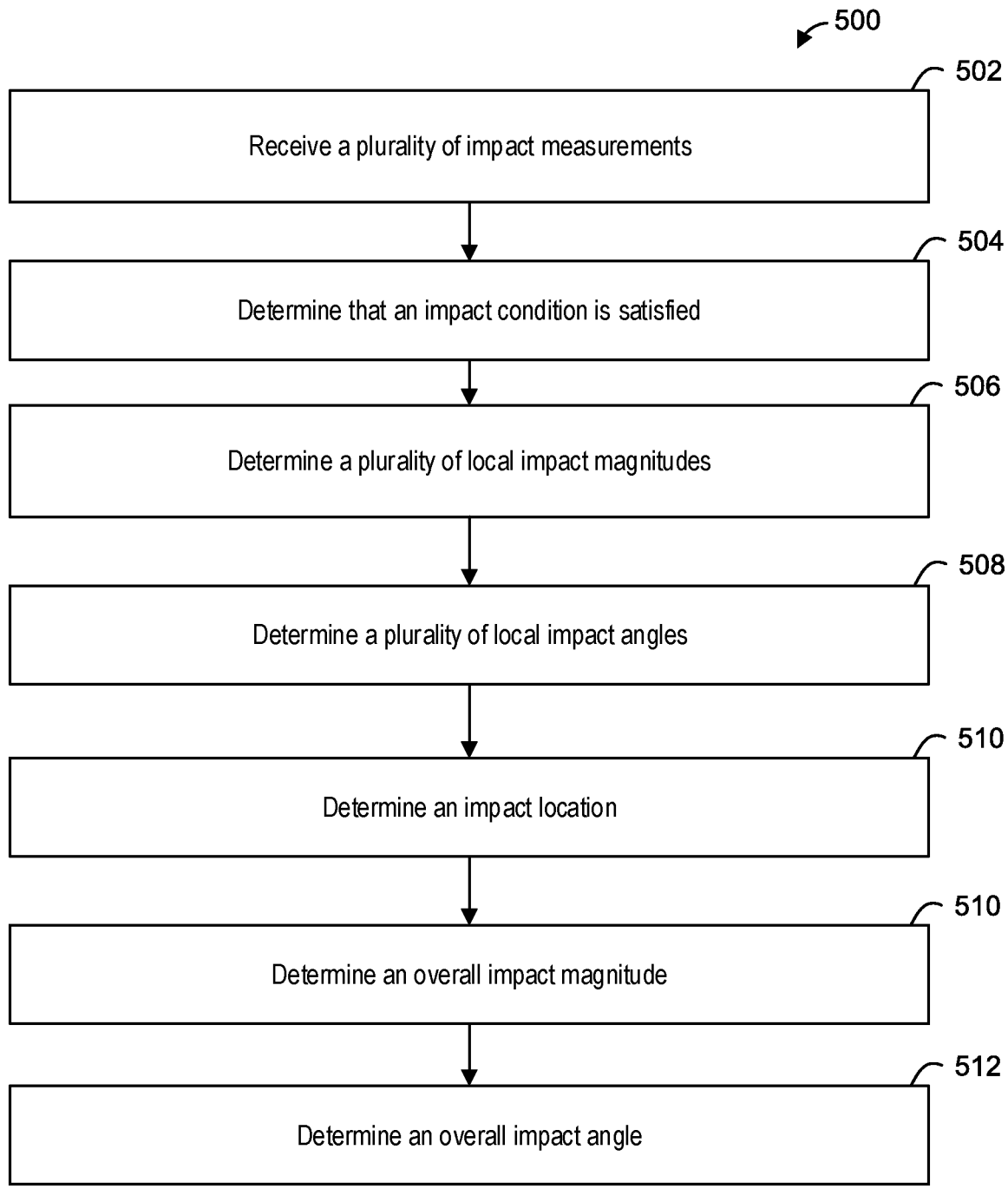
FIG. 5 is a flow chart of another example method of operating an impact sensing system in accordance with an embodiment.

Referring now to FIG. 5, shown therein is another example method 500 for sensing impacts applied to an article 104. The method 500 may be implemented using the impact sensing system 102. The method 500 will be described below with reference to the impact sensing system 102 for ease of exposition. However, it should be appreciated that one or more steps of the method 500 may be implemented by the analysis system 108.

At 502, the processor 206 can receive a plurality of impact measurements, as described at 402. The processor 206 can receive the plurality of impact measurements from the impact sensors 204. In some embodiments, the processor 206 may receive the impact measurements from the impact sensors 204 via the multiplexer 212.

The plurality of impact measurements can include a set of impact measurements from each impact sensor 204. Each set of impact measurements can be a set of directional impact measurements. For example, each set of impact measurements may include a first directional impact measurement corresponding to a first direction, a second directional impact measurement corresponding to a second direction, and a third directional measurement corresponding to a third direction. Each of the first, second, and third directions may be defined as orthogonal to the other respective directions.

For example, each set of impact measurements may be a set of acceleration measurements from an accelerometer. Each acceleration measurement can correspond to a direction defined by an x-y-z coordinate axis system. That is, each set of acceleration measurements can include an acceleration measurement measured in the x direction, an acceleration measurement measured in the y-direction, and an acceleration measurement measured in the z direction.

At 504, the processor 206 can determine that an impact condition is satisfied. The processor 206 can determine that an impact condition is satisfied when at least one impact measurement exceeds a predetermined impact value. For instance, continuing with the example of x, y, and z directional acceleration measurements, the processor 206 can identify an impact condition when the magnitude one or more of the directional acceleration measurements (or combinations thereof) exceeds a predetermined acceleration magnitude value.

At 506, the processor 206 can determine a plurality of local impact magnitudes. Each local impact magnitude can correspond to a particular impact sensor 204 and can be determined from the set of impact measurements corresponding to that particular impact sensor.

Each local impact magnitude can be a three-dimensional local impact magnitude. The processor 206 may determine the three-dimensional local impact magnitude for a particular impact sensor based on the first directional impact measurement, the second directional impact measurement, and the third directional impact measurement generated by that impact sensor.

For instance, continuing with the example of x, y, and z directional acceleration measurements, each local impact magnitude can be determined using the following equation:

$$m = \sqrt{x^2 + y^2 + z^2}$$

where m is a local impact magnitude, x is the magnitude of the acceleration measurement in the x direction, y is the magnitude of the acceleration measurement in the y direction, and z is the magnitude of the acceleration measurement in the z direction.

At 508, the processor 206 determines a plurality of local impact angles. Each local impact angle can correspond to a particular impact sensor 204 and can be determined from the set of impact measurements corresponding to that particular impact sensor.

Each local impact angle can be a lateral local impact angle. For example, the article 104 can extend longitudinally between a first end and a second end in the third direction. In this example, the lateral local impact angle can be defined in a plane transverse the third direction (i.e., defined by the first and second directions). The processor 206 may determine the lateral impact angle for a particular impact sensor based on the first directional impact measurement and the second directional impact measurement generated by that impact sensor.

For instance, continuing with the example of x, y, and z directional acceleration measurements, the article 104 can extend longitudinally between the first end and the second end in the z direction. The lateral impact angle can be defined in the x-y plane (i.e., transverse the z direction). Each lateral local impact angle can be determined based on the corresponding acceleration measurements in the x and y directions.

The magnitude of each acceleration measurement in the x direction can be modeled using the following equation:

$$x = m \cdot \cos(\theta)$$

where x is the magnitude of an acceleration measurement in the x direction, m is a corresponding local impact magnitude, and θ is a corresponding lateral local impact angle.

Similarly, the magnitude of each acceleration measurement in the y direction can be modeled using the following equation:

$$y = m \cdot \sin(\theta)$$

where y is the magnitude of an acceleration measurement in the y direction, m is a corresponding local impact magnitude, and θ is a corresponding lateral local impact angle.

Figure 6:
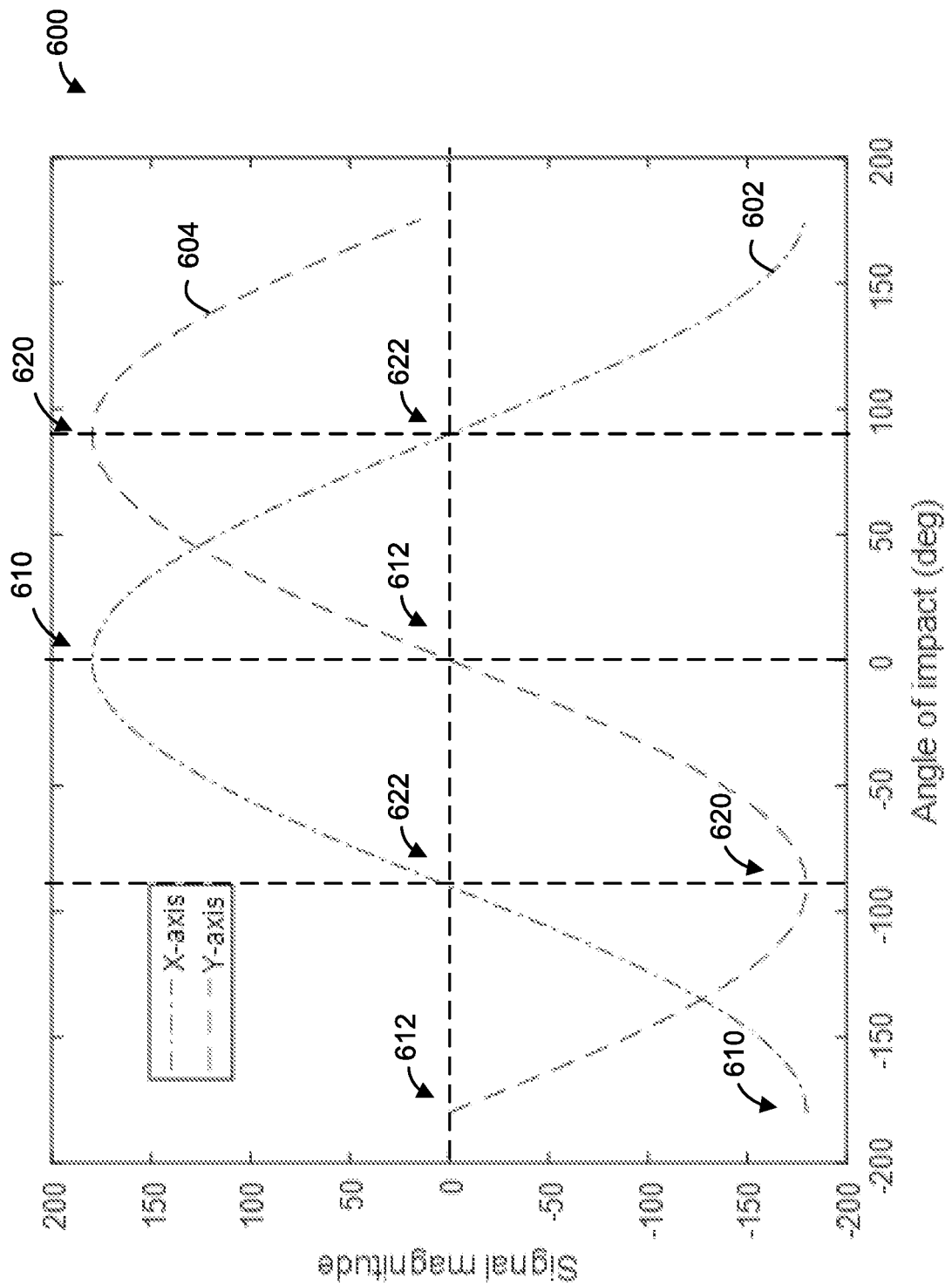
FIG. 6 is an example plot of modelled impact measurement data in accordance with an embodiment.

Referring to FIG. 6, there is shown a plot 600 of example modeled impact measurement data. Data series 602 illustrates the change in the magnitude of an acceleration measurement in x direction as the corresponding lateral impact angle changes. Similarly, data series 604 illustrates the change in the magnitude of an acceleration measurement in the y direction as the corresponding lateral impact angle changes. As shown in FIG. 6, the acceleration measurement in the x direction 602 is 90 degrees out of phase of the acceleration measurement in the y direction 604. That is, when the magnitude of the acceleration measurement in the x direction is at a maximum at 610, the magnitude of the acceleration in the y direction is zero at 612. Similarly, when the magnitude of the acceleration in the y direction is at a maximum at 620, the magnitude of acceleration in the x direction is zero at 622.

Each lateral local impact angle can be determined by combining the equations for modeling the magnitude of acceleration measurements in the x and y directions.

$$\frac{y}{x} = \frac{m \cdot \sin(\theta)}{m \cdot \cos(\theta)} = \tan(\theta)$$

More specifically, each lateral local impact angle can be determined using on the following equation:

$$\theta = \tan^{-1}\left(\frac{y}{x}\right)$$

where θ is a lateral local impact angle, y is the magnitude of a corresponding acceleration measurement in the y direction, and x is the magnitude of a corresponding acceleration measurement in the x direction.

Figure 7:
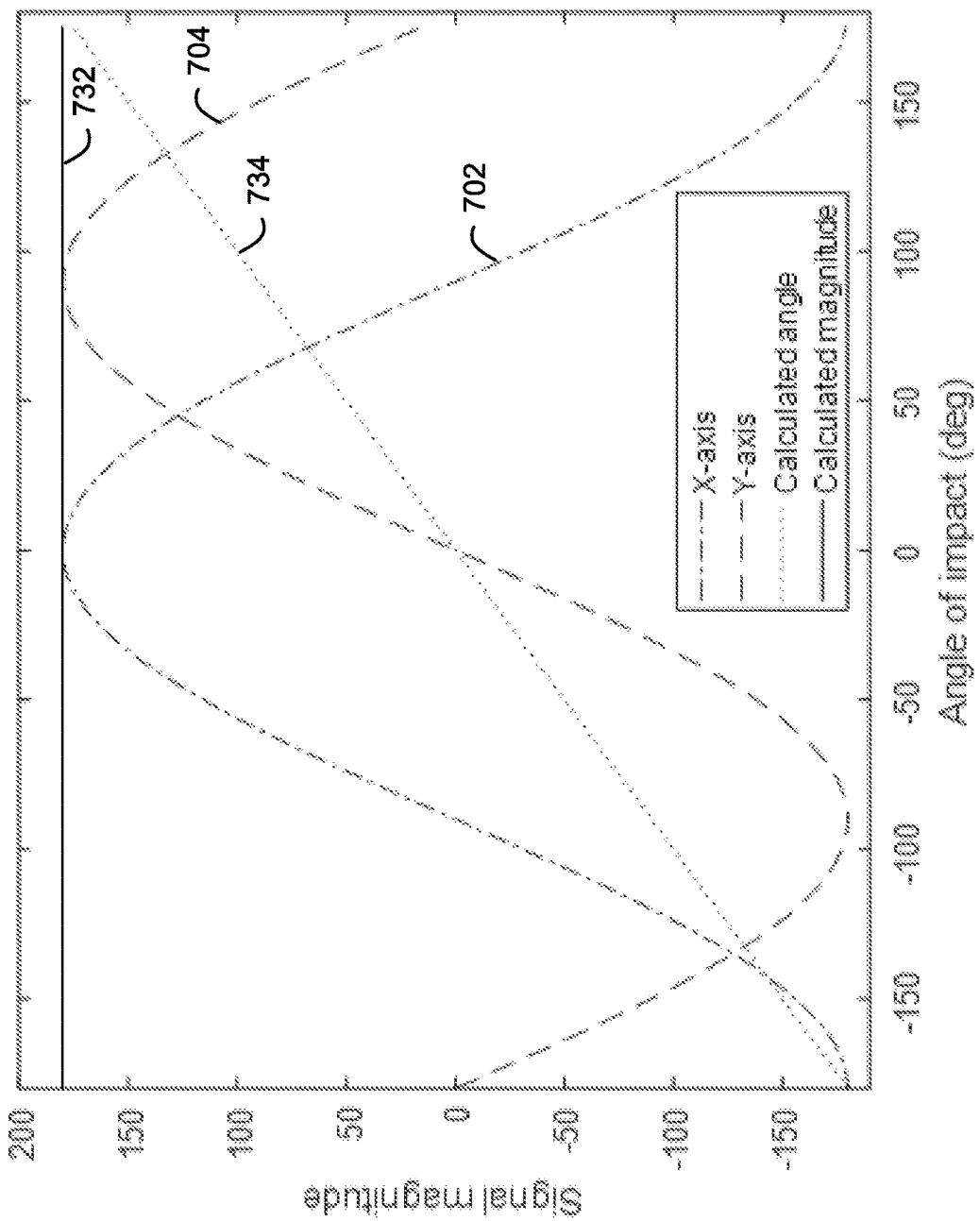
FIG. 7 is another example plot of modeled impact measurement data in accordance with an embodiment.

Referring now to FIG. 7, there is shown another plot 700 of example modeled impact measurement data. Similar to FIG. 6, FIG. 7 also includes data series 702 and 704, illustrating the magnitude of an acceleration measurement in x direction and the magnitude of an acceleration measurement in y direction as a function of the corresponding lateral local impact angle. However, FIG. 7 further includes data series 732 and data series 734. Data series 732 illustrates that the local impact magnitude does not change as the corresponding lateral local impact angle changes. Data series 734 illustrates the lateral local impact angle as a function of itself.

Referring again to FIG. 5, at 508, the processor 206 determines an impact location. The processor 206 can determine the impact location based on the plurality of local impact magnitudes and the corresponding sensor locations.

The impact location may be referred to as an impact height. For example, when the article 104 extends longitudinally between the first end and the second end in the third direction, the impact location can be a position along the third direction (e.g. a location height). For instance, continuing with the example of x, y, and z directional acceleration measurements, when the article 104 longitudinally extends between the first end and the second end in the z direction, the impact location can be a position along the z direction.

In some embodiments, the processor 206 can determine the impact location using a sinusoidal model of the plurality of local impact magnitudes. For example, the impact sensing system 102 shown in FIG. 3A includes first and second impact sensors 204A and 204B that are positioned at the first and second ends 302 and 304 of the article 104, respectively. The local impact magnitude of the first impact sensor 204A can be modeled using the following equation:

$$m1 = A \cdot \sin\left(\frac{\pi}{2}h\right)$$

where m1 is the local impact magnitude for the first impact sensor 204A, A is overall actual impact magnitude, and h is the impact location.

Similarly, the local impact magnitude of the second impact sensor 204B can be modeled using the following equation:

$$m2 = A \cdot \cos\left(\frac{\pi}{2}h\right)$$

where m2 is the local impact magnitude for the second impact sensor 204B, A is overall impact magnitude, and h is the impact location. The impact location may be determined as a normalized impact location between the first and second ends 302 and 304 of the article 104. For example, an impact at the first end 302 may be represented by an impact location of zero while an impact at the second end 304 may be represented by an impact location of one (or vice versa).

The impact location can be determined by combining the equations for modeling the local impact magnitudes for the first and second impact sensors 204A and 204B, using on the following equation:

$$h = \frac{2}{\pi} \cdot \tan^{-1}\left(\frac{m1}{m2}\right)$$

where h is the impact location, m1 is the local impact magnitude for the first impact sensor 204A, and m2 is the local impact magnitude for the second sensor.

Figure 8:
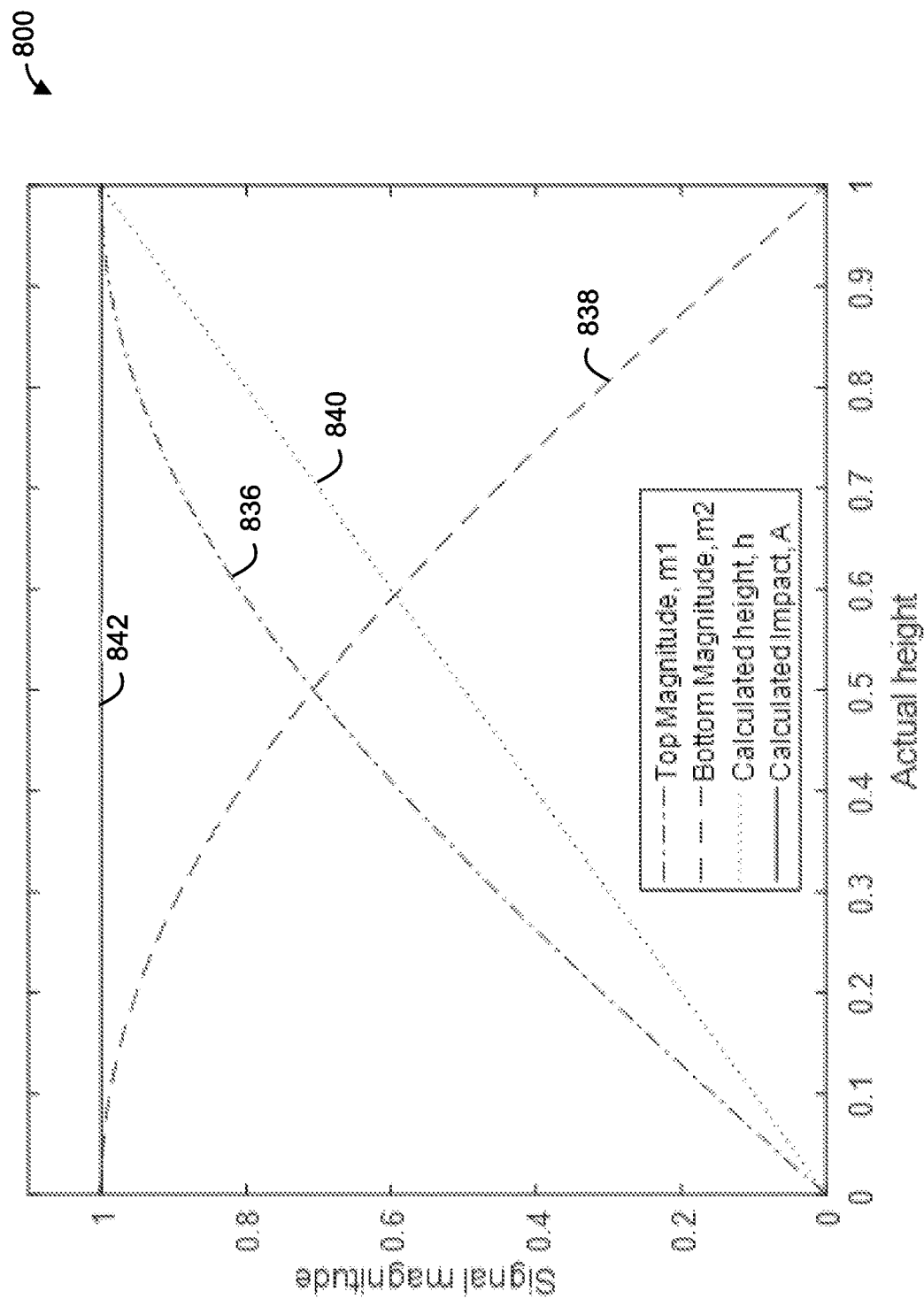
FIG. 8 is another plot of example modeled impact magnitude data in accordance with an embodiment.

Referring now to FIG. 8, there is shown a plot 800 of example modeled impact magnitude data. Data series 836 illustrates the change in the local impact magnitude for the first impact sensor 204A as the impact location changes. Similarly, data series 838 illustrates the change in local impact magnitude for the second impact sensor 204B as the impact location changes. Data series 840 illustrates the impact location as a function of itself.

As shown in FIG. 8, the local impact magnitude for the first impact sensor 204A increases as the impact location approaches the location of the first impact sensor 204A. Similarly, the local impact magnitude of the first impact sensor 204A decreases as the impact location moves away from the location the first impact sensor 204A. Likewise, the local impact magnitude of the second impact sensor 204B also increases or decreases, depending on the impact location.

In some embodiments, the first and second impact sensors 204A and 204B may be positioned inward from the first and second ends 302 and 304 of the article 104. That is, the first impact sensor 204A may be spaced apart from the first end 302 and the second impact sensor 204B may be spaced apart from the second end 304. The first and second impact sensors 204A and 204B may both be positioned towards the midpoint of the article 104, away from the first and second ends 302 and 304. In such embodiments, the local impact magnitude of the first impact sensor 204A and the second impact sensor 204B may instead be modeled using the following equations, respectively:

$$m1 = A \cdot \sin\left(\frac{\pi}{2}hf - \vartheta + \varphi\right)$$

$$m2 = A \cdot \cos\left(\frac{\pi}{2}hf - \vartheta\right)$$

where $$\varphi = \frac{\pi}{2}(1-f) + 2\vartheta$$

and where f and $\vartheta$ are offsets specific to the configuration of the impact sensing system 102. For example, the value f and $\vartheta$ may vary, depending on the position of the first and second impact sensors 204A and 204B. For example, value f may correspond to the distance between the first impact sensor 204A and the first end 302 and value $\vartheta$ may correspond to the distance between the second impact sensor 204B and the second end 304. In some cases, f and $\vartheta$ may be empirically derived. As noted above, m1 is the local impact magnitude for the first impact sensor 204A, m2 is the local impact magnitude for the second impact sensor 204B, A is overall impact magnitude, and h is the impact location.

In these embodiments, the impact location can be instead modeled using the following equation:

$$h = \frac{2}{\pi f} \cdot \left[\vartheta + \tan^{-1}\left(\frac{\frac{m1}{m2} - \sin\varphi}{\cos\varphi}\right)\right]$$

It should be appreciated that in the case where f=1 and $\vartheta$=0, these equations may be reduced to the simpler equations described above.

Figure 10:
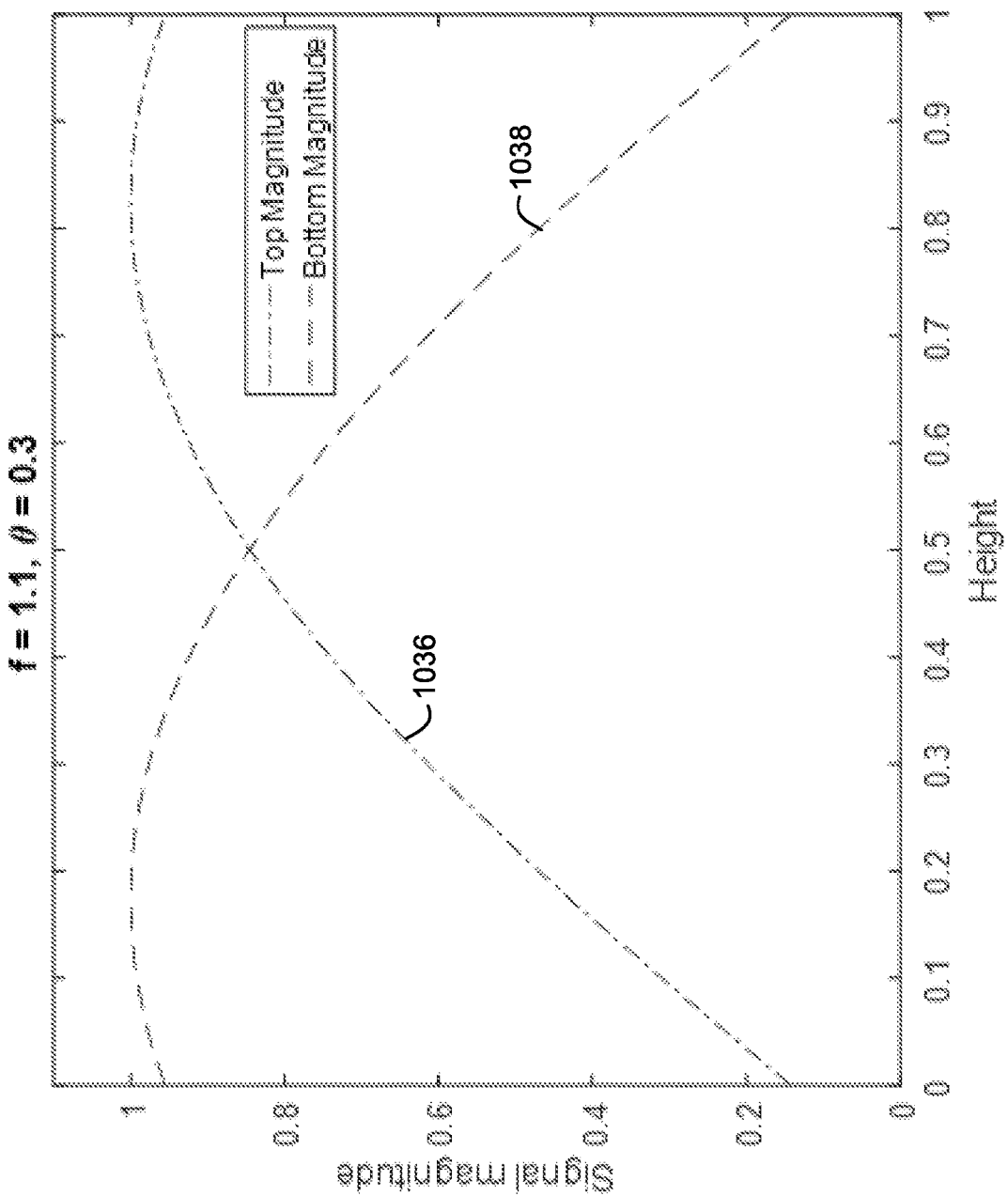
FIG. 10 is another plot of example modeled impact magnitude data in accordance with an embodiment.

Referring now to FIG. 10, there is shown a plot 1000 of example modeled impact magnitude data when the first and second impact sensors 204A and 204B are positioned inside of the first and second ends 302 and 304. Specifically, FIG. 10 illustrates example modeled impact magnitude data where the offsets are f=1.1 and $\vartheta$=0.3.

Data series 1036 illustrates the change in the local impact magnitude for the first impact sensor 204A as the impact location changes. Similarly, data series 1038 illustrates the change in local impact magnitude for the second impact sensor 204B as the impact location changes.

As shown in FIG. 10, the maxima of the local impact magnitudes for the first and second impact sensors 204A and 204B correspond to the respective locations of the first and second impact sensors 204A and 204B. The locations of the first and second impact sensors 204A and 204B are closer to the midpoint of the article 104, away from the first and second ends 302 and 304.

Referring again to FIG. 5, at 510, the processor 206 determines an overall impact magnitude. The processor 206 can determine the overall impact magnitude based on the impact location and the plurality of local impact magnitudes.

For instance, continuing with the example of the impact sensing system 102 shown in FIG. 3A, the overall impact magnitude can be determined using the following equation:

$$A = m1 \cdot \sin\left(\frac{\pi}{2}h\right) + m2 \cdot \cos\left(\frac{\pi}{2}h\right)$$

where A is the overall impact magnitude, m1 is the local impact magnitude for the first impact sensor 204A, m2 is the local impact magnitude for the second impact sensor 204B, and h is the impact position.

Referring again to FIG. 8, plot 800 further includes data series 842 which illustrates the overall impact magnitude. As shown in FIG. 8, the overall impact magnitude 842 does not change as the impact position changes.

When the first and second impact sensors 204A and 204B are positioned inside of the first and second ends 302 and 304 of the article 104, the overall impact magnitude can instead be determined using the following equation:

$$A = \frac{m1 * \frac{\sin(fh - \vartheta)}{\cos\varphi} + m2 * \cos(fh - \vartheta)}{1 + \frac{1}{2}\sin[2(fh - \vartheta)] * \tan\varphi}$$

As noted above, A is the overall impact magnitude, m1 is the local impact magnitude for the first impact sensor 204A, m2 is the local impact magnitude for the second impact sensor 204B, A is overall impact magnitude, and h is the impact location, and f and $\vartheta$ are offsets specific to the configuration of the impact sensing system 102. When f=1 and $\vartheta$=0, this equation may be reduced to the simpler equation described above.

Referring again to FIG. 5, at 512, the processor 206 can determine an overall impact angle. The processor 206 can determine the overall impact angle based on the impact location and the plurality of local impact angles.

In some embodiments, the processor 206 can determine the overall impact angle by weighting the plurality of local impact angles. The plurality of local impact angles can be weighted based on the impact location and the corresponding sensor locations.

For instance, continuing with the example of the impact sensing system 102 shown in FIG. 3A, the overall impact angle can be determined using the following equation:

$$\theta = h \cdot \theta_1 + (1-h) \cdot \theta_2$$

where θ is the overall impact angle, h is the impact location, $θ_1$ is the local impact angle for the first impact sensor 204A and $θ_2$ is the local impact angle for the second impact sensor 204B. It should be noted that the above equation may also be used when the first and second impact sensors 204A and 204B are positioned inside of the first and second ends 302 and 304 of the article 104.

Figure 9:
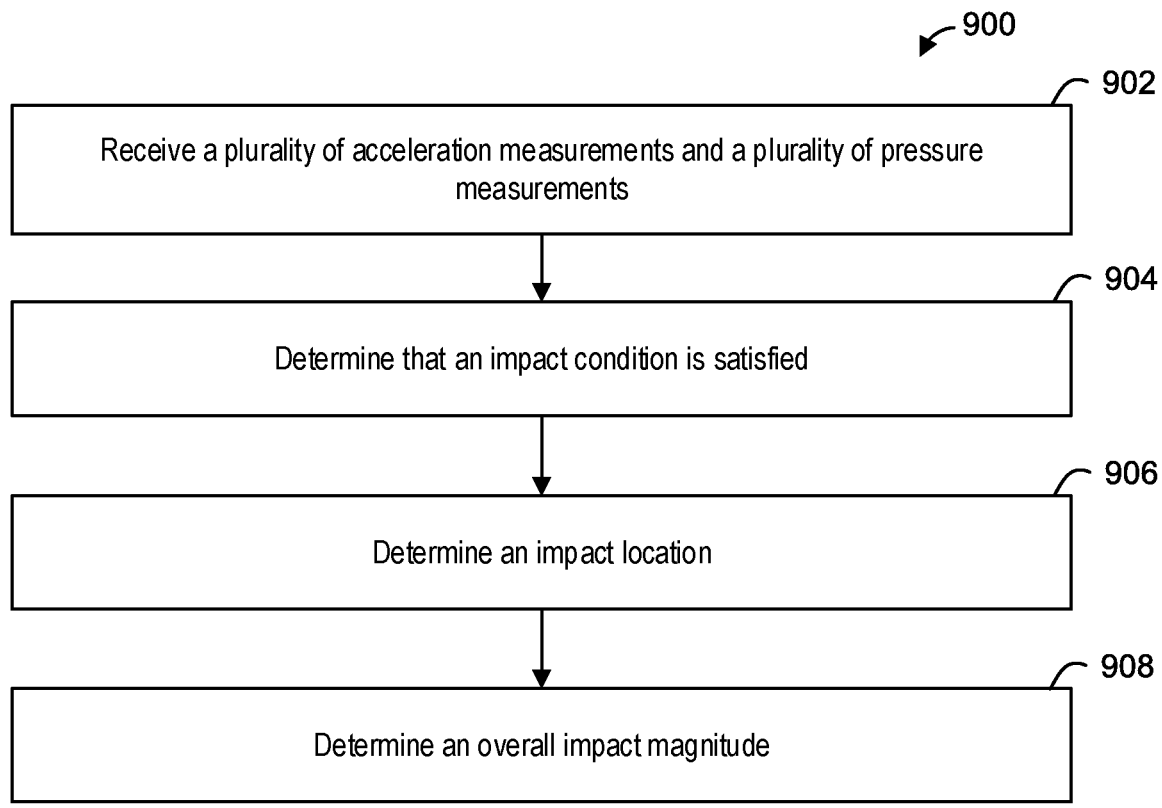
FIG. 9 is a flow chart of another example method of operating an impact sensing system in accordance with an embodiment.

Referring now to FIG. 9, shown therein is an example method 900 for sensing impacts applied to an article 104. The method 900 may be implemented using the impact sensing system 102. The method 900 will be described below with reference to the impact sensing system 102 for ease of exposition. However, it should be appreciated that one or more steps of the method 900 may be implemented by the analysis system 108.

The method 900 begins at 902, where the processor 206 receives a plurality of acceleration measurements and a plurality of pressure measurements. The processor 206 can receive the plurality of acceleration measurements from an accelerometer and the pressure measurements from a pressure sensor. In some embodiments, the processor 206 may receive the some of the measurements from the accelerometer or the pressure sensor via the multiplexer 212.

At 904, the processor 206 determines that an impact condition is satisfied. In some embodiments, the processor 206 can determine that an impact condition is satisfied when at least one impact measurement exceeds a predetermined impact value. For example, the processor 206 can identify an impact condition when at least one acceleration measurement exceeds a predetermined acceleration value. In another example, the processor 206 can identify an impact condition when at least one pressure measurement exceeds a predetermined pressure value.

At 906, the processor 206 determines an impact location. The processor 206 can determine the impact location based on the plurality of pressure measurements and the corresponding sensor locations. For example, the processor 206 may determine the impact location based on the pressure measurement with the largest magnitude and the sensor location of the pressure sensor associated with that pressure measurement.

In some embodiments, the processor 206 may determine the impact location using a model. For example, the model may predict impact pressure measurement values for particular sensor locations, for a particular impact at a particular impact location. The processor 206 can determine the impact location based on the actual pressure measurements and the model, for example, by comparing the actual pressure measurements with the predicted pressure measurements. For instance, the processor 206 can determine an impact location that, based on predictions from the model, approximately match the actual pressure measurements with the predicted pressure measurements. In some embodiments, the model can receive the pressure measurements and sensor locations as an input, and output the impact location.

At 908 the processor 206 can determine an overall impact magnitude. The processor 206 can determine the overall impact magnitude based on the impact location and the plurality of acceleration measurements.

For example, the processor 206 may determine the overall impact magnitude using a model. The model may predict acceleration measurement values for a particular sensor location, for a particular impact at a particular impact location and having a particular overall impact magnitude. The processor 206 can determine the overall impact magnitude based on the actual acceleration measurements and the model, for example, by comparing the actual acceleration measurements with the predicted acceleration measurements. For instance, the processor 206 can determine an overall impact magnitude that, based on the predictions from the model using the impact location, approximately match the actual acceleration measurements with the predicted acceleration measurements. In some embodiments, the model can receive the acceleration measurements, sensor location, and impact location as an input, and output the overall impact magnitude.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An impact sensing system for sensing impacts applied to an article undergoing a manufacturing, a transportation or a distribution process, the impact sensing system comprising:

a plurality of impact sensors having corresponding sensitivity thresholds, wherein at least one impact sensor has a higher sensitivity threshold than at least one other impact sensor, the plurality of impact sensors being fixed to the article, each of the impact sensors being fixed to the article at a corresponding sensor location, wherein the at least one impact sensor having a higher sensitivity threshold is fixed to the article at a first sensor location and the at least one other impact sensor is fixed to the article at a second sensor location, wherein the plurality of impact sensors are configured to generate a plurality of impact measurements in response to an impact applied to the article and wherein the sensitivity threshold of each impact sensor is selected based on the corresponding sensor location and an expected frequency of impact at the corresponding sensor location; and a processor coupled to the plurality of impact sensors, the processor configured to:
define an impact threshold;
receive the plurality of impact measurements from the plurality of impact sensors, wherein the plurality of impact measurements comprises a set of impact measurements from each of at least one impact sensor;
determine whether one or more of the set of impact measurements from each of the at least one impact sensor falls below the impact threshold and if so, classify the corresponding one or more of the set of impact measurements as noise;
determine whether one or more of the set of impact measurements from each of the at least one impact sensor satisfies the impact threshold and if so, classify the corresponding one or more of the set of impact measurements as impact;
for the impact measurements classified as impact:
determine a plurality of local impact angles, each of the local impact angles corresponding to an impact sensor and being determined from the corresponding one or more impact measurements classified as impact corresponding to that impact sensor;
determine an impact location based on the corresponding one or more impact measurements classified as impact and the corresponding sensor locations;
determine an overall impact magnitude at the impact location based at least on:
for each of the impact sensors, weighting the one or more impact measurements classified as impact corresponding to that impact sensor based on the corresponding sensor location and the impact location, and determining the overall impact magnitude based on the weighted impact measurements;
determine an overall impact angle at the impact location based at least on:
for each of the impact sensors, weighting the local impact angle corresponding to that impact sensor based on the corresponding sensor location and the impact location, and determining the overall impact angle based on the weighted local impact angles.

2. The impact sensing system of claim 1, wherein, for the impact measurements classified as impact, the processor is further configured to:
determine a plurality of local impact magnitudes, each of the local impact magnitudes corresponding to an impact sensor of the plurality of impact sensors and being determined from the one or more impact measurements classified as impact corresponding to that impact sensor;
determine the impact location based on the plurality of local impact magnitudes and the corresponding sensor locations; and
determine the overall impact magnitude based on the impact location and the plurality of local impact magnitudes.

3. The impact sensing system of claim 2, wherein:
the plurality of impact sensors comprises a plurality of inertial impact sensors;
each of the inertial impact sensors is configured to generate a first directional impact measurement corresponding to a first direction, a second directional impact measurement corresponding to a second direction, and a third directional impact measurement corresponding to a third direction, wherein:
the first direction is defined as orthogonal to the second direction and the third direction;
the second direction is defined as orthogonal to the first direction and the third direction; and
the third direction is defined as orthogonal to the first direction and the second direction; and
the processor is configured to, for the impact measurements classified as impact, determine the plurality of local impact magnitudes by, for each of the corresponding inertial impact sensors, determining a three-dimensional local impact magnitude based on the first directional impact measurement, the second directional impact measurement, and the third directional impact measurement.

4. The impact sensing system of claim 3, wherein:
the article extends longitudinally between a first end and a second end in the third direction; and
the processor is configured to, for the impact measurements classified as impact, determine the local impact angle for each of the corresponding inertial impact sensor by determining a lateral local impact angle based on the first directional impact measurement and the second directional impact measurement.

5. The impact sensing system of claim 2, wherein the processor is configured to determine the impact location using a sinusoidal model of the plurality of local impact magnitudes.

6. The impact sensing system of claim 2, wherein:
the plurality of impact sensors comprises a first inertial impact sensor and a second inertial impact sensor;
the first inertial impact sensor is fixed to a bottom portion of the article; and
the second inertial impact sensor is fixed to a top portion of the article.

7. The impact sensing system of claim 2, wherein the plurality of impact sensors comprises a plurality of inertial impact sensors and the plurality of inertial impact sensors are fixed to an interior of the article.

8. The impact sensing system of claim 2, wherein the plurality of impact sensors comprises at least one orientation sensor.

9. The impact sensing system of claim 1, wherein:
the plurality of impact sensors includes at least one accelerometer and at least one pressure sensor, the at least one pressure sensor operable to detect pressures at a plurality of pressure sensor locations on the article;
the plurality of impact measurements includes a plurality of acceleration measurements from the at least one accelerometer and a plurality of pressure measurements from the at least one pressure sensor corresponding to the plurality of pressure sensor locations;
the processor is configured to, for the impact measurements classified as impact:
determine the impact location based on at least one pressure measurement and the corresponding pressure sensor location; and
determine the overall impact magnitude based on the impact location and the plurality of acceleration measurements.

10. The impact sensing system of claim 9, wherein:
the at least one pressure sensor is fixed to an exterior of the article and is provided by a flexible material that conforms to a shape of the article.

11. The impact sensing system of claim 9, wherein the at least one pressure sensor is a capacitive sensor.

12. The impact sensing system of claim 1, wherein the article is one of a pharmaceutical package and a beverage container.

13. The impact sensing system of claim 1, wherein the processor is further configured to:
determine a vibration measurement based on the plurality of impact measurements.

14. A method for sensing impacts applied to an article undergoing a manufacturing, a transportation or a distribution process, the method comprising:
receiving, by a processor, a plurality of impact measurements, the plurality of impact measurements being generated by a plurality of impact sensors having corresponding sensitivity threshold, fixed to the article in response to an impact applied to the article, wherein the plurality of impact sensors have a corresponding sensitivity threshold such that at least one impact sensor has a higher sensitivity threshold than at least one other impact sensor, each of the impact sensors being fixed to the article at a corresponding sensor location, the at least one impact sensor having a higher sensitivity threshold is fixed to the article at a first sensor location and the at least one other impact sensor is fixed to the article at a second sensor location, the plurality of impact measurements comprises a set of impact measurements from each of at least one impact sensor, and the sensitivity threshold of each impact sensor is selected based on the corresponding sensor location and an expected frequency of impact at the corresponding sensor location, the processor being coupled to the plurality of impact sensors;

defining, by the processor, an impact threshold;

determining, by the processor, whether one or more of the set of impact measurements from each of the at least one impact sensor falls below the impact threshold and if so, classify the corresponding one or more of the set of impact measurements as noise;

determining, by the processor, whether one or more of the set of impact measurements from each of the at least one impact sensor satisfies the impact threshold and if so, classify the corresponding one or more of the set of impact measurements as impact;

for the impact measurements classified as impact:

determining, by the processor, a plurality of local impact angles, each of the local impact angles corresponding to an impact sensor and being determined from the corresponding one or more impact measurements classified as impact corresponding to that impact sensor;

determining, by the processor, an impact location based on the corresponding one or more impact measurements classified as impact and the corresponding sensor locations;

determining, by the processor, an overall impact magnitude at the impact location based at least on:

for each of the impact sensors, weighting the one or more impact measurements classified as impact corresponding to that impact sensor based on the corresponding sensor location and the impact location, and determining the overall impact magnitude based on the weighted impact measurements; and determining, by the processor, an overall impact angle at the impact location based at least on:

for each of the impact sensors, weighting the local impact angle corresponding to that impact sensor based on the corresponding sensor location and the impact location, and determining the overall impact angle based on the weighted local impact angles.

15. The method of claim 14, further comprising, for the impact measurements classified as impact:

determining, by the processor, a plurality of local impact magnitudes, each of the local impact magnitudes corresponding to an impact sensor of the plurality of impact sensors and being determined from the one or more impact measurements corresponding to that impact sensor;

determining, by the processor, the impact location based on the plurality of local impact magnitudes and the corresponding sensor locations; and determining, by the processor, the overall impact magnitude based on the impact location and the plurality of local impact magnitudes.

16. The method of claim 15, wherein:

the plurality of impact sensors comprises a plurality of inertial impact sensors, each of the inertial impact sensors is configured to generate a first directional impact measurement corresponding to a first direction, a second directional impact measurement corresponding to a second direction, and a third directional impact measurement corresponding to a third direction, wherein:

the first direction is defined as orthogonal to the second direction and the third direction;

the second direction is defined as orthogonal to the first direction and the third direction; and the third direction is defined as orthogonal to the first direction and the second direction; and the method further comprises:

determining, by the processor, for the impact measurements classified as impact, the plurality of local impact magnitudes by, for each of the corresponding inertial impact sensors, determining a three-dimensional local impact magnitude based on the first directional impact measurement, the second directional impact measurement, and the third directional impact measurement.

17. The method of claim 16, wherein:

the article extends longitudinally between a first end and a second end in the third direction, and the method comprises:

determining, by the processor, for the impact measurements classified as impact, the local impact angle for each of the corresponding inertial impact sensor by determining a lateral local impact angle based on the first directional impact measurement and the second directional impact measurement.

18. The method of claim 15, wherein the impact location is determined using a sinusoidal model of the plurality of local impact magnitudes.

19. The method of claim 15, wherein:

the plurality of impact sensors comprises a first inertial impact sensor located at a bottom portion of the article and a second inertial impact sensor located at a top portion of the article.

20. The method of claim 15, wherein the plurality of impact sensors are located within an interior of the article.

21. The method of claim 14, wherein:

the plurality of impact sensors includes one or more accelerometers operable to detect acceleration measurements and one or more pressure sensors operable to detect pressures at one or more pressure sensor locations on the article, the method further comprising, for the impact measurements classified as impact:

determining, by the processor, the impact location based on at least one pressure measurement and the corresponding pressure sensor location; and determining, by the processor, the overall impact magnitude based on the impact location and the plurality of acceleration measurements.

22. The method of claim 14, further comprising:

determining, by the processor, a vibration measurement based on the plurality of impact measurements.

23. An impact sensing system for sensing impacts applied to an article undergoing a manufacturing, a transportation or a distribution process, wherein the article extends between a first end and a second end, the impact sensing system comprising:

a first impact sensor having a first sensitivity threshold, the first impact sensor being fixed to the article proximate the first end, wherein the first impact sensor is configured to generate a first set of impact measurements in response to an impact applied to the article;

a second impact sensor having a second sensitivity threshold, the second impact sensor being fixed to the article proximate the second end, wherein the second impact sensor is configured to generate a second set of impact measurements in response to the impact applied to the article;

wherein the first sensitivity threshold is different from the second sensitivity threshold, the first sensitivity threshold being based on a first location of the first impact sensor fixed to the article and an expected frequency of impact at the first location corresponding to the first impact sensor and the second sensitivity threshold being based on a second location corresponding to the second impact sensor fixed to the article and an expected frequency of impact at the second location of the second impact sensor; and a processor coupled to the first impact sensor and to the second impact sensor, wherein the processor is configured to:

receive the first set of impact measurements from the first impact sensor;

determine whether one or more of the first set of impact measurements falls below an impact threshold defined by the processor, and if so, classify the corresponding one or more of the first set of impact measurements as noise;

determine whether one or more of the first set of impact measurements satisfies the impact threshold and if so, classify the corresponding one or more of the first set of impact measurements as impact;

for the one or more of the first set of impact measurements classified as impact:

determine a first local impact magnitude from the one or more of the first set of impact measurements;

determine a first local impact angle from the one or more of the first set of impact measurements;

receive the second set of impact measurements from the second impact sensor;

determine whether one or more of the second set of impact measurements falls below the impact threshold, and if so, classify the corresponding one or more of the second set of impact measurements as noise;

determine whether one or more of the second set of impact measurements satisfies the impact threshold and if so, classify the corresponding one or more of the second set of impact measurements as impact;

for the one or more of the second set of impact measurements classified as impact:

determine a second local impact magnitude from the one or more of the second set of impact measurements;

determine a second local impact angle from the one or more of the second set of impact measurements;

determine an impact location based on the first local impact magnitude and the second local impact magnitude;

determine an overall impact magnitude at the impact location based on the impact location, the first local impact magnitude and the second local impact magnitude; and determine an overall impact angle at the impact location based on the impact location, the first local impact angle, and the second local impact angle.

24. The impact sensing system of claim 23, wherein the first impact sensor comprises a first tri-axial accelerometer; and the second impact sensor comprises a second tri-axial accelerometer.

25. The impact sensing system of claim 23, wherein the first impact sensor and the second impact sensor are mounted to an interior of the article; and at least one pressure sensor is mounted to an exterior of the article.

26. The impact sensing system of claim 25, wherein the at least one pressure sensor is a capacitive sensor.

27. The impact sensing system of claim 23, wherein the first impact sensor comprises an orientation sensor.

* * * * *